(12) United States Patent
Haegermarck et al.

(10) Patent No.: US 10,678,251 B2
(45) Date of Patent: *Jun. 9, 2020

(54) CLEANING METHOD FOR A ROBOTIC CLEANING DEVICE

(71) Applicant: Aktiebolaget Electrolux, Stockholm (SE)

(72) Inventors: Anders Haegermarck, Trångsund (SE); Magnus Lindhé, Stockholm (SE)

(73) Assignee: Aktiebolaget Electrolux, Stockholm (SE)

( * ) Notice: Subject to any disclaimer, the term of this patent is extended or adjusted under 35 U.S.C. 154(b) by 181 days.

This patent is subject to a terminal disclaimer.

(21) Appl. No.: 15/535,506

(22) PCT Filed: Dec. 16, 2014

(86) PCT No.: PCT/EP2014/077954
§ 371 (c)(1),
(2) Date: Jun. 13, 2017

(87) PCT Pub. No.: WO2016/095966
PCT Pub. Date: Jun. 23, 2016

(65) Prior Publication Data
US 2017/0344013 A1    Nov. 30, 2017

(51) Int. Cl.
*G06F 19/00* (2018.01)
*G05D 1/02* (2020.01)
(Continued)

(52) U.S. Cl.
CPC .............. *G05D 1/0219* (2013.01); *A47L 5/22* (2013.01); *A47L 9/009* (2013.01); *A47L 9/0411* (2013.01);
(Continued)

(58) Field of Classification Search
CPC .. G05D 1/0219; G05D 1/0234; G05D 1/0274; G05D 1/0238; G05D 2201/0215;
(Continued)

(56) References Cited

U.S. PATENT DOCUMENTS

| 1,286,321 A | 12/1918 | Hoover |
| 1,401,007 A | 12/1921 | Staples |

(Continued)

FOREIGN PATENT DOCUMENTS

| CA | 2154758 | 6/1995 |
| CN | 1116818 | 2/1996 |

(Continued)

OTHER PUBLICATIONS

Chinese Office Action for Chinese Application No. 201380075503.9, dated Nov. 8, 2017 with translation, 16 pages.

(Continued)

*Primary Examiner* — Ian Jen
(74) *Attorney, Agent, or Firm* — RatnerPrestia

(57) ABSTRACT

A method of operating a robotic cleaning device over a surface to be cleaned, the method being performed by the robotic cleaning device. The method includes: following a boundary of a first object while registering path markers including positional information at intervals on the surface; tracing previously registered path markers at an offset upon encountering one or more of the previously registered path markers; and switching from tracing the previously registered path markers to following an edge of a second object upon detection of the second object.

15 Claims, 7 Drawing Sheets

(51) Int. Cl.

| | |
|---|---|
| A47L 5/22 | (2006.01) |
| A47L 9/00 | (2006.01) |
| A47L 9/04 | (2006.01) |
| A47L 9/28 | (2006.01) |
| A47L 11/24 | (2006.01) |
| A47L 11/28 | (2006.01) |
| A47L 11/40 | (2006.01) |

(52) U.S. Cl.
CPC ............ *A47L 9/0477* (2013.01); *A47L 9/2826* (2013.01); *A47L 9/2852* (2013.01); *A47L 11/24* (2013.01); *A47L 11/28* (2013.01); *A47L 11/4011* (2013.01); *A47L 11/4061* (2013.01); *G05D 1/0234* (2013.01); *G05D 1/0238* (2013.01); *G05D 1/0274* (2013.01); *A47L 2201/04* (2013.01); *G05D 1/0272* (2013.01); *G05D 2201/0215* (2013.01)

(58) Field of Classification Search
CPC ....... G05D 1/0272; A47L 5/22; A47L 9/0477; A47L 9/2826; A47L 9/2852; A47L 11/24; A47L 11/28; A47L 9/0411; A47L 11/4011; A47L 11/4061; A47L 9/009; A47L 2201/04
See application file for complete search history.

(56) References Cited

U.S. PATENT DOCUMENTS

| | | |
|---|---|---|
| 3,010,129 A | 11/1961 | Moore |
| 3,233,274 A | 2/1966 | Kroll |
| 3,550,714 A | 12/1970 | Bellinger |
| 3,570,227 A | 3/1971 | Bellinger |
| 3,713,505 A | 1/1973 | Muller |
| 3,837,028 A | 9/1974 | Bridge |
| 4,028,765 A | 6/1977 | Liebscher |
| 4,036,147 A | 7/1977 | Westling |
| 4,114,711 A | 9/1978 | Wilkins |
| 4,119,900 A | 10/1978 | Kremnitz |
| 4,306,174 A | 12/1981 | Mourier |
| 4,306,329 A | 12/1981 | Yokoi |
| 4,369,543 A | 1/1983 | Chen |
| 4,502,173 A | 3/1985 | Patzold |
| 4,627,511 A | 12/1986 | Yajima |
| 4,647,209 A | 3/1987 | Neukomm |
| 4,800,978 A | 1/1989 | Wasa |
| 4,822,450 A | 4/1989 | Davis |
| 4,825,091 A | 4/1989 | Breyer |
| 4,836,905 A | 6/1989 | Davis |
| 4,838,990 A | 6/1989 | Jucha |
| 4,842,686 A | 6/1989 | Davis |
| 4,849,067 A | 7/1989 | Jucha |
| 4,854,000 A | 8/1989 | Takimoto |
| 4,864,511 A | 9/1989 | Moy |
| 4,872,938 A | 10/1989 | Davis |
| 4,878,003 A | 10/1989 | Knepper |
| 4,886,570 A | 12/1989 | Davis |
| 4,918,607 A | 4/1990 | Wible |
| 4,919,224 A | 4/1990 | Shyu |
| 4,922,559 A | 5/1990 | Wall |
| 4,959,192 A | 9/1990 | Trundle |
| 4,962,453 A | 10/1990 | Pong |
| 4,989,818 A | 2/1991 | Trundle |
| 5,001,635 A | 3/1991 | Yasutomi |
| 5,006,302 A | 4/1991 | Trundle |
| 5,023,444 A | 6/1991 | Ohman |
| 5,032,775 A | 7/1991 | Mizuno |
| 5,034,673 A | 7/1991 | Shoji |
| 5,042,861 A | 8/1991 | Trundle |
| 5,045,118 A | 9/1991 | Mason |
| 5,086,535 A | 2/1992 | Grossmeyer |
| 5,095,577 A | 3/1992 | Jonas |
| 5,107,946 A | 4/1992 | Kamimura |
| 5,155,683 A | 10/1992 | Rahim |
| 5,243,732 A | 9/1993 | Koharagi |
| 5,245,177 A | 9/1993 | Schiller |
| 5,276,933 A | 1/1994 | Hennessey |
| 5,279,672 A | 1/1994 | Betker |
| 5,293,955 A | 3/1994 | Lee |
| 5,307,273 A | 4/1994 | Oh |
| 5,309,592 A | 5/1994 | Hiratsuka |
| 5,341,540 A | 8/1994 | Soupert |
| 5,345,639 A | 9/1994 | Tanoue |
| 5,349,378 A | 9/1994 | Maali |
| 5,353,224 A | 10/1994 | Lee |
| 5,367,458 A | 11/1994 | Roberts et al. |
| 5,369,347 A | 11/1994 | Yoo |
| 5,377,106 A | 12/1994 | Drunk |
| 5,390,627 A | 2/1995 | van der Berg |
| 5,398,632 A | 3/1995 | Goldbach |
| 5,402,051 A | 3/1995 | Fujiwara |
| 5,440,216 A | 8/1995 | Kim |
| 5,444,965 A | 8/1995 | Colens |
| 5,446,356 A | 8/1995 | Kim |
| 5,454,129 A | 10/1995 | Kell |
| 5,518,552 A | 5/1996 | Tanoue |
| 5,534,762 A | 7/1996 | Kim |
| 5,548,511 A | 8/1996 | Bancroft |
| 5,560,077 A | 10/1996 | Crotchett |
| 5,568,589 A | 10/1996 | Hwang |
| 5,621,291 A | 4/1997 | Lee |
| 5,646,494 A | 7/1997 | Han |
| 5,666,689 A | 9/1997 | Andersen |
| 5,682,313 A | 10/1997 | Edlund |
| 5,682,640 A | 11/1997 | Han |
| 5,687,294 A | 11/1997 | Jeong |
| 5,698,957 A | 12/1997 | Sowada |
| 5,745,946 A | 5/1998 | Thrasher |
| 5,758,298 A | 5/1998 | Guldner |
| 5,778,554 A | 7/1998 | Jones |
| 5,781,960 A | 7/1998 | Kilstrom |
| 5,787,545 A | 8/1998 | Colens |
| 5,815,880 A | 10/1998 | Nakanishi |
| 5,825,981 A | 10/1998 | Matsuda |
| 5,841,259 A | 11/1998 | Kim |
| 5,852,984 A | 12/1998 | Matsuyama |
| 5,867,800 A | 2/1999 | Leif |
| 5,890,250 A | 4/1999 | Lange |
| 5,896,488 A | 4/1999 | Jeong |
| 5,903,124 A | 5/1999 | Kawakami |
| 5,926,909 A | 7/1999 | McGee |
| 5,933,902 A | 8/1999 | Frey |
| 5,935,179 A | 8/1999 | Kleiner |
| 5,940,927 A | 8/1999 | Haegermarck |
| 5,942,869 A | 8/1999 | Katou |
| 5,947,051 A | 9/1999 | Geiger |
| 5,959,423 A | 9/1999 | Nakanishi |
| 5,959,424 A | 9/1999 | Elkmann |
| 5,966,765 A | 10/1999 | Hamada |
| RE36,391 E | 11/1999 | van den Berg |
| 5,983,833 A | 11/1999 | van der Lely |
| 5,987,696 A | 11/1999 | Wang |
| 5,991,951 A | 11/1999 | Kubo |
| 5,995,884 A | 11/1999 | Allen |
| 5,997,670 A | 12/1999 | Walter |
| 5,999,865 A | 12/1999 | Bloomquist et al. |
| 6,012,470 A | 1/2000 | Jones |
| 6,024,107 A | 2/2000 | Jones |
| 6,064,926 A | 5/2000 | Sarangapani |
| 6,076,662 A | 6/2000 | Bahten |
| 6,082,377 A | 7/2000 | Frey |
| 6,124,694 A | 9/2000 | Bancroft |
| 6,142,252 A | 11/2000 | Kinto |
| 6,176,067 B1 | 1/2001 | Bahten |
| 6,213,136 B1 | 4/2001 | Jones |
| 6,226,830 B1 | 5/2001 | Hendriks |
| 6,230,360 B1 | 5/2001 | Singleton |
| 6,240,342 B1 * | 5/2001 | Fiegert .................. B25J 9/1666 180/169 |
| 6,251,551 B1 | 6/2001 | Kunze-Concewitz |
| 6,255,793 B1 | 7/2001 | Peless |
| 6,263,989 B1 | 7/2001 | Won |

(56) References Cited

U.S. PATENT DOCUMENTS

| | | |
|---|---|---|
| 6,300,737 B1 | 10/2001 | Bergvall |
| 6,311,366 B1 | 11/2001 | Sepke |
| 6,327,741 B1 | 12/2001 | Reed |
| 6,339,735 B1 | 1/2002 | Peless |
| 6,358,325 B1 | 3/2002 | Andreas |
| 6,360,801 B1 | 3/2002 | Walter |
| 6,370,452 B1 | 4/2002 | Pfister |
| 6,370,453 B2 | 4/2002 | Sommer |
| 6,381,801 B1 | 5/2002 | Clemons, Sr. |
| 6,389,329 B1 | 5/2002 | Colens |
| 6,413,149 B1 | 7/2002 | Wada |
| 6,417,641 B2 | 7/2002 | Peless |
| 6,431,296 B1 | 8/2002 | Won |
| 6,438,456 B1 | 8/2002 | Feddema |
| 6,443,509 B1 | 9/2002 | Levin |
| 6,457,199 B1 | 10/2002 | Frost |
| 6,457,206 B1 | 10/2002 | Judson |
| 6,459,955 B1 * | 10/2002 | Bartsch .................. A47L 9/00 700/245 |
| 6,465,982 B1 | 10/2002 | Bergvall |
| 6,481,515 B1 | 11/2002 | Kirkpatrick |
| 6,482,678 B1 | 11/2002 | Frost |
| 6,493,612 B1 | 12/2002 | Bisset |
| 6,493,613 B2 | 12/2002 | Peless |
| 6,496,754 B2 | 12/2002 | Song |
| 6,504,610 B1 | 1/2003 | Bauer |
| 6,519,804 B1 | 2/2003 | Vujik |
| 6,525,509 B1 | 2/2003 | Petersson |
| D471,243 S | 3/2003 | Cioffi |
| 6,532,404 B2 | 3/2003 | Colens |
| 6,535,793 B2 | 3/2003 | Allard |
| 6,571,415 B2 | 6/2003 | Gerber |
| 6,580,246 B2 | 6/2003 | Jacobs |
| 6,581,239 B1 | 6/2003 | Dyson |
| 6,594,844 B2 | 7/2003 | Jones |
| 6,597,143 B2 | 7/2003 | Song |
| 6,601,265 B1 | 8/2003 | Burlington |
| 6,605,156 B1 | 8/2003 | Clark |
| 6,609,962 B1 | 8/2003 | Wakabayashi |
| 6,611,120 B2 | 8/2003 | Song |
| 6,611,318 B2 | 8/2003 | LaPolice |
| 6,615,108 B1 | 9/2003 | Peless |
| 6,615,885 B1 | 9/2003 | Ohm |
| 6,633,150 B1 | 10/2003 | Wallach |
| 6,637,446 B2 | 10/2003 | Frost |
| 6,658,325 B2 | 12/2003 | Zweig |
| 6,661,239 B1 | 12/2003 | Ozick |
| 6,662,889 B2 | 12/2003 | De Fazio |
| 6,667,592 B2 | 12/2003 | Jacobs |
| 6,668,951 B2 | 12/2003 | Won |
| 6,671,592 B1 | 12/2003 | Bisset |
| 6,690,134 B1 * | 2/2004 | Jones .................. A47L 9/009 318/567 |
| 6,726,823 B1 | 4/2004 | Wang |
| 6,732,826 B2 | 5/2004 | Song |
| 6,745,431 B2 | 6/2004 | Dijksman |
| 6,748,297 B2 | 6/2004 | Song |
| 6,769,004 B2 | 7/2004 | Barrett |
| 6,774,596 B1 | 8/2004 | Bisset |
| 6,775,871 B1 | 8/2004 | Finch |
| 6,781,338 B2 | 8/2004 | Jones |
| 6,809,490 B2 | 10/2004 | Jones |
| 6,810,305 B2 | 10/2004 | Kirkpatrick, Jr. |
| 6,820,801 B2 | 11/2004 | Kaneko |
| 6,841,963 B2 | 1/2005 | Song |
| 6,845,297 B2 | 1/2005 | Allard |
| 6,850,024 B2 | 2/2005 | Peless |
| 6,859,010 B2 | 2/2005 | Jeon |
| 6,859,976 B2 | 3/2005 | Plankenhorn |
| 6,860,206 B1 | 3/2005 | Rudakevych |
| 6,868,307 B2 | 3/2005 | Song |
| 6,869,633 B2 | 3/2005 | Sus |
| 6,870,792 B2 | 3/2005 | Chiappetta |
| 6,882,334 B1 | 4/2005 | Meyer |
| 6,883,201 B2 | 4/2005 | Jones |
| 6,885,912 B2 | 4/2005 | Peless |
| 6,901,624 B2 | 6/2005 | Mori |
| 6,925,679 B2 | 8/2005 | Wallach |
| D510,066 S | 9/2005 | Hickey |
| 6,938,298 B2 | 9/2005 | Aasen |
| 6,939,208 B2 | 9/2005 | Kamimura |
| 6,940,291 B1 | 9/2005 | Ozick |
| 6,941,199 B1 | 9/2005 | Bottomley |
| 6,942,548 B2 | 9/2005 | Wada |
| 6,956,348 B2 | 10/2005 | Landry |
| 6,957,712 B2 | 10/2005 | Song |
| 6,964,312 B2 | 11/2005 | Maggio |
| 6,965,209 B2 | 11/2005 | Jones |
| 6,967,275 B2 | 11/2005 | Ozick |
| 6,971,140 B2 | 12/2005 | Kim |
| 6,971,141 B1 | 12/2005 | Tak |
| 6,984,952 B2 | 1/2006 | Peless |
| 7,000,623 B2 | 2/2006 | Welsh |
| 7,004,269 B2 | 2/2006 | Song |
| 7,013,200 B2 | 3/2006 | Wakui |
| 7,013,527 B2 | 3/2006 | Thomas, Sr. |
| 7,015,831 B2 | 3/2006 | Karlsson |
| 7,024,278 B2 | 4/2006 | Chiappetta |
| 7,031,805 B2 | 4/2006 | Lee |
| 7,040,968 B2 | 5/2006 | Kamimura |
| 7,042,342 B2 | 5/2006 | Luo |
| 7,043,794 B2 | 5/2006 | Conner |
| 7,050,926 B2 | 5/2006 | Theurer et al. |
| 7,053,578 B2 | 5/2006 | Diehl et al. |
| 7,053,580 B2 | 5/2006 | Aldred |
| 7,054,716 B2 | 5/2006 | McKee |
| 7,059,012 B2 | 6/2006 | Song |
| 7,079,923 B2 | 7/2006 | Abramson |
| 7,082,350 B2 | 7/2006 | Skoog |
| D526,753 S | 8/2006 | Tani |
| 7,085,624 B2 | 8/2006 | Aldred |
| 7,103,449 B2 | 9/2006 | Woo |
| 7,113,847 B2 | 9/2006 | Chmura |
| 7,117,067 B2 | 10/2006 | McLurkin |
| 7,133,745 B2 | 11/2006 | Wang |
| 7,134,164 B2 | 11/2006 | Alton |
| 7,135,992 B2 | 11/2006 | Karlsson |
| 7,143,696 B2 | 12/2006 | Rudakevych |
| 7,145,478 B2 | 12/2006 | Goncalves |
| 7,150,068 B1 | 12/2006 | Ragner |
| 7,155,308 B2 | 12/2006 | Jones |
| 7,155,309 B2 | 12/2006 | Peless |
| 7,162,338 B2 | 1/2007 | Goncalves |
| 7,167,775 B2 | 1/2007 | Abramson |
| 7,173,391 B2 | 2/2007 | Jones |
| 7,174,238 B1 | 2/2007 | Zweig |
| 7,177,737 B2 | 2/2007 | Karlsson |
| 7,184,586 B2 | 2/2007 | Jeon |
| 7,185,396 B2 | 3/2007 | Im |
| 7,185,397 B2 | 3/2007 | Stuchlik |
| 7,188,000 B2 | 3/2007 | Chiappetta |
| 7,196,487 B2 | 3/2007 | Jones |
| 7,199,711 B2 | 4/2007 | Field |
| 7,200,892 B2 | 4/2007 | Kim |
| 7,202,630 B2 | 4/2007 | Dan |
| 7,206,677 B2 | 4/2007 | Hulden |
| 7,207,081 B2 | 4/2007 | Gerber |
| 7,208,892 B2 | 4/2007 | Tondra |
| 7,213,298 B2 | 5/2007 | Cipolla |
| 7,213,663 B2 | 5/2007 | Kim |
| 7,222,390 B2 | 5/2007 | Cipolla |
| 7,225,500 B2 | 6/2007 | Diehl |
| 7,237,298 B2 | 7/2007 | Reindle |
| 7,240,396 B2 | 7/2007 | Thomas, Sr. |
| 7,246,405 B2 | 7/2007 | Yan |
| 7,248,951 B2 | 7/2007 | Hulden |
| 7,251,853 B2 | 8/2007 | Park |
| 7,254,464 B1 | 8/2007 | McLurkin |
| 7,254,859 B2 | 8/2007 | Gerber |
| 7,269,877 B2 | 9/2007 | Tondra |
| 7,272,467 B2 | 9/2007 | Goncalves |
| 7,272,868 B2 | 9/2007 | Im |
| 7,274,167 B2 | 9/2007 | Kim |
| 7,275,280 B2 | 10/2007 | Haegermarck |

(56) References Cited

U.S. PATENT DOCUMENTS

| | | |
|---|---|---|
| 7,288,912 B2 | 10/2007 | Landry |
| D556,961 S | 12/2007 | Swyst |
| 7,303,776 B2 | 12/2007 | Sus |
| 7,324,870 B2 | 1/2008 | Lee |
| 7,331,436 B1 | 2/2008 | Pack |
| 7,332,890 B2 | 2/2008 | Cohen |
| 7,343,221 B2 | 3/2008 | Ann |
| 7,343,719 B2 | 3/2008 | Sus |
| 7,346,428 B1 | 3/2008 | Huffman |
| 7,349,759 B2 | 3/2008 | Peless |
| 7,359,766 B2 | 4/2008 | Jeon |
| 7,363,994 B1 | 4/2008 | DeFazio |
| 7,369,460 B2 | 5/2008 | Chiappetta |
| 7,372,004 B2 | 5/2008 | Buchner |
| 7,388,343 B2 | 6/2008 | Jones |
| 7,389,156 B2 | 6/2008 | Ziegler |
| 7,389,166 B2 | 6/2008 | Harwig |
| 7,403,360 B2 | 7/2008 | Cunningham |
| 7,412,748 B2 | 8/2008 | Lee |
| 7,417,404 B2 | 8/2008 | Lee |
| 7,418,762 B2 | 9/2008 | Arai |
| 7,424,766 B2 | 9/2008 | Reindle |
| 7,429,843 B2 | 9/2008 | Jones |
| 7,430,455 B2 | 9/2008 | Casey |
| 7,438,766 B2 | 10/2008 | Song |
| 7,441,298 B2 | 10/2008 | Svendsen |
| 7,444,206 B2 | 10/2008 | Abramson |
| 7,448,113 B2 | 11/2008 | Jones |
| 7,459,871 B2 | 12/2008 | Landry |
| 7,464,157 B2 | 12/2008 | Okude |
| 7,474,941 B2 | 1/2009 | Kim |
| 7,480,958 B2 | 1/2009 | Song |
| 7,480,960 B2 | 1/2009 | Kim |
| D586,959 S | 2/2009 | Geringer |
| 7,489,277 B2 | 2/2009 | Sung |
| 7,489,985 B2 | 2/2009 | Ko |
| 7,499,774 B2 | 3/2009 | Barrett |
| 7,499,775 B2 | 3/2009 | Filippov |
| 7,499,776 B2 | 3/2009 | Allard |
| 7,499,804 B2 | 3/2009 | Svendsen |
| 7,503,096 B2 | 3/2009 | Lin |
| 7,515,991 B2 | 4/2009 | Egawa |
| D593,265 S | 5/2009 | Carr |
| 7,539,557 B2 | 5/2009 | Yamauchi |
| 7,546,891 B2 | 6/2009 | Won |
| 7,546,912 B1 | 6/2009 | Pack |
| 7,555,363 B2 | 6/2009 | Augenbraun |
| 7,556,108 B2 | 7/2009 | Won |
| 7,559,269 B2 | 7/2009 | Rudakevych |
| 7,564,571 B2 | 7/2009 | Karabassi |
| 7,566,839 B2 | 7/2009 | Hukuba |
| 7,567,052 B2 | 7/2009 | Jones |
| 7,568,259 B2 | 8/2009 | Yan |
| 7,568,536 B2 | 8/2009 | Yu |
| 7,571,511 B2 | 8/2009 | Jones |
| 7,573,403 B2 | 8/2009 | Goncalves |
| 7,574,282 B2 | 8/2009 | Petersson |
| 7,578,020 B2 | 8/2009 | Jaworski |
| 7,579,803 B2 | 8/2009 | Jones |
| 7,581,282 B2 | 9/2009 | Woo |
| 7,597,162 B2 | 10/2009 | Won |
| 7,600,521 B2 | 10/2009 | Woo |
| 7,600,593 B2 | 10/2009 | Filippov |
| 7,603,744 B2 | 10/2009 | Reindle |
| 7,604,675 B2 | 10/2009 | Makarov |
| 7,610,651 B2 | 11/2009 | Baek |
| 7,613,543 B2 | 11/2009 | Petersson |
| 7,620,476 B2 | 11/2009 | Morse |
| 7,636,982 B2 | 12/2009 | Jones |
| 7,647,144 B2 | 1/2010 | Haegermarck |
| 7,650,666 B2 | 1/2010 | Jang |
| 7,654,348 B2 | 2/2010 | Ohm |
| 7,660,650 B2 | 2/2010 | Kawagoe |
| 7,663,333 B2 | 2/2010 | Jones |
| 7,673,367 B2 | 3/2010 | Kim |
| 7,679,532 B2 | 3/2010 | Karlsson |
| 7,688,676 B2 | 3/2010 | Chiappetta |
| 7,693,654 B1 | 4/2010 | Dietsch |
| 7,697,141 B2 | 4/2010 | Jones |
| 7,706,917 B1 * | 4/2010 | Chiappetta ............ G05D 1/0225 700/245 |
| 7,706,921 B2 | 4/2010 | Jung |
| 7,709,497 B2 | 5/2010 | Christensen, IV |
| 7,711,450 B2 | 5/2010 | Im |
| 7,720,572 B2 | 5/2010 | Ziegler |
| 7,721,829 B2 | 5/2010 | Lee |
| 7,729,801 B2 | 6/2010 | Abramson |
| 7,749,294 B2 | 7/2010 | Oh |
| 7,751,940 B2 | 7/2010 | Lee |
| 7,761,954 B2 | 7/2010 | Ziegler |
| 7,765,635 B2 | 8/2010 | Park |
| 7,765,638 B2 * | 8/2010 | Pineschi ............... A47L 9/0411 15/377 |
| 7,769,490 B2 | 8/2010 | Abramson |
| 7,774,158 B2 | 8/2010 | Domingues Goncalves |
| 7,779,504 B2 | 8/2010 | Lee |
| 7,780,796 B2 | 8/2010 | Shim |
| 7,784,139 B2 | 8/2010 | Sawalski |
| 7,784,570 B2 | 8/2010 | Couture |
| 7,785,544 B2 | 8/2010 | Alward |
| 7,787,991 B2 | 8/2010 | Jeung |
| 7,793,614 B2 | 9/2010 | Ericsson |
| 7,801,645 B2 | 9/2010 | Taylor |
| 7,805,220 B2 | 9/2010 | Taylor |
| 7,827,653 B1 | 11/2010 | Liu |
| 7,832,048 B2 | 11/2010 | Harwig |
| 7,835,529 B2 | 11/2010 | Hernandez |
| 7,843,431 B2 | 11/2010 | Robbins |
| 7,844,364 B2 | 11/2010 | McLurkin |
| 7,849,555 B2 | 12/2010 | Hahm |
| 7,856,291 B2 | 12/2010 | Jung |
| 7,860,608 B2 | 12/2010 | Lee |
| 7,861,365 B2 | 1/2011 | Sun |
| 7,861,366 B2 | 1/2011 | Hahm |
| 7,873,437 B2 | 1/2011 | Aldred |
| 7,877,166 B2 | 1/2011 | Harwig |
| 7,886,399 B2 | 2/2011 | Dayton |
| 7,890,210 B2 | 2/2011 | Choi |
| 7,891,045 B2 | 2/2011 | Kim |
| 7,891,289 B2 | 2/2011 | Day |
| 7,891,446 B2 | 2/2011 | Couture |
| 7,894,951 B2 | 2/2011 | Norris |
| 7,916,931 B2 | 3/2011 | Lee |
| 7,920,941 B2 | 4/2011 | Park |
| 7,921,506 B2 | 4/2011 | Baek |
| 7,926,598 B2 | 4/2011 | Rudakevych |
| 7,934,571 B2 | 5/2011 | Chiu |
| 7,937,800 B2 | 5/2011 | Yan |
| 7,942,107 B2 | 5/2011 | Vosburgh |
| 7,957,837 B2 | 6/2011 | Ziegler |
| 7,962,997 B2 | 6/2011 | Chung |
| 7,966,339 B2 | 6/2011 | Kim |
| 7,975,790 B2 | 7/2011 | Kim |
| 7,979,175 B2 | 7/2011 | Allard |
| 7,979,945 B2 | 7/2011 | Dayton |
| 7,981,455 B2 | 7/2011 | Sus |
| 7,997,118 B2 | 8/2011 | Mecca |
| 8,001,651 B2 | 8/2011 | Chang |
| 8,007,221 B1 | 8/2011 | More |
| 8,010,229 B2 | 8/2011 | Kim |
| 8,019,223 B2 | 9/2011 | Hudson |
| 8,020,657 B2 | 9/2011 | Allard |
| 8,032,978 B2 | 10/2011 | Haegermarck |
| 8,034,390 B2 | 10/2011 | Sus |
| 8,042,663 B1 | 10/2011 | Pack |
| 8,046,103 B2 | 10/2011 | Abramson |
| 8,061,461 B2 | 11/2011 | Couture |
| 8,065,778 B2 | 11/2011 | Kim |
| 8,073,439 B2 | 12/2011 | Stromberg |
| 8,074,752 B2 | 12/2011 | Rudakevych |
| 8,078,338 B2 | 12/2011 | Pack |
| 8,079,432 B2 | 12/2011 | Ohm |
| 8,082,836 B2 | 12/2011 | More |
| 8,086,419 B2 | 12/2011 | Goncalves |

(56) References Cited

U.S. PATENT DOCUMENTS

| | | |
|---|---|---|
| 8,087,117 B2 | 1/2012 | Kapoor |
| 8,095,238 B2 | 1/2012 | Jones |
| 8,095,336 B2 | 1/2012 | Goncalves |
| 8,107,318 B2 | 1/2012 | Chiappetta |
| 8,108,092 B2 | 1/2012 | Phillips |
| 8,109,191 B1 | 2/2012 | Rudakevych |
| 8,112,942 B2 | 2/2012 | Bohm |
| 8,113,304 B2 | 2/2012 | Won |
| 8,122,982 B2 | 2/2012 | Morey |
| 8,127,396 B2 | 3/2012 | Mangiardi |
| 8,127,399 B2 | 3/2012 | Dilger |
| 8,127,704 B2 | 3/2012 | Vosburgh |
| 8,136,200 B2 | 3/2012 | Splinter |
| 8,150,650 B2 | 4/2012 | Goncalves |
| D659,311 S | 5/2012 | Geringer |
| 8,166,904 B2 | 5/2012 | Israel |
| 8,195,333 B2 | 6/2012 | Ziegler |
| 8,196,251 B2 | 6/2012 | Lynch |
| 8,199,109 B2 | 6/2012 | Robbins |
| 8,200,600 B2 | 6/2012 | Rosenstein |
| 8,200,700 B2 | 6/2012 | Moore |
| 8,237,389 B2 | 8/2012 | Fitch |
| 8,237,920 B2 | 8/2012 | Jones |
| 8,239,992 B2 | 8/2012 | Schnittman |
| 8,244,469 B2 | 8/2012 | Cheung |
| 8,253,368 B2 | 8/2012 | Landry |
| 8,255,092 B2 | 8/2012 | Phillips |
| 8,256,542 B2 | 9/2012 | Couture |
| 8,265,793 B2 | 9/2012 | Cross |
| 8,274,406 B2 | 9/2012 | Karlsson |
| 8,281,703 B2 | 10/2012 | Moore |
| 8,281,731 B2 | 10/2012 | Vosburgh |
| 8,290,619 B2 | 10/2012 | McLurkin |
| 8,292,007 B2 | 10/2012 | DeFazio |
| 8,295,125 B2 | 10/2012 | Chiappetta |
| D670,877 S | 11/2012 | Geringer |
| 8,308,529 B2 | 11/2012 | DAmbra |
| 8,311,674 B2 | 11/2012 | Abramson |
| 8,316,971 B2 | 11/2012 | Couture |
| 8,318,499 B2 | 11/2012 | Fritchie |
| D672,928 S | 12/2012 | Swett |
| 8,322,470 B2 | 12/2012 | Ohm |
| 8,326,469 B2 | 12/2012 | Phillips |
| 8,327,960 B2 | 12/2012 | Couture |
| 8,336,479 B2 | 12/2012 | Vosburgh |
| 8,342,271 B2 | 1/2013 | Filippov |
| 8,347,088 B2 | 1/2013 | Moore |
| 8,347,444 B2 | 1/2013 | Schnittman |
| 8,350,810 B2 | 1/2013 | Robbins |
| 8,353,373 B2 | 1/2013 | Rudakevych |
| 8,364,309 B1 | 1/2013 | Bailey |
| 8,364,310 B2 | 1/2013 | Jones |
| 8,365,848 B2 | 2/2013 | Won |
| 8,368,339 B2 | 2/2013 | Jones |
| 8,370,985 B2 | 2/2013 | Schnittman |
| 8,374,721 B2 | 2/2013 | Halloran |
| 8,375,838 B2 | 2/2013 | Rudakevych |
| 8,378,613 B2 | 2/2013 | Landry |
| 8,380,350 B2 | 2/2013 | Ozick |
| 8,382,906 B2 | 2/2013 | Konandreas |
| 8,386,081 B2 | 2/2013 | Landry |
| 8,387,193 B2 | 3/2013 | Ziegler |
| 8,390,251 B2 | 3/2013 | Cohen |
| 8,392,021 B2 | 3/2013 | Konandreas |
| 8,396,592 B2 * | 3/2013 | Jones .................. A47L 11/00 318/568.12 |
| 8,396,611 B2 | 3/2013 | Phillips |
| 8,402,586 B2 | 3/2013 | Lavabre |
| 8,408,956 B1 | 4/2013 | Vosburgh |
| 8,412,377 B2 | 4/2013 | Casey |
| 8,413,752 B2 | 4/2013 | Page |
| 8,417,188 B1 | 4/2013 | Vosburgh |
| 8,417,383 B2 | 4/2013 | Ozick |
| 8,418,303 B2 | 4/2013 | Kapoor |
| 8,418,642 B2 | 4/2013 | Vosburgh |
| 8,428,778 B2 | 4/2013 | Landry |
| 8,433,442 B2 | 4/2013 | Friedman |
| D682,362 S | 5/2013 | Mozeika |
| 8,438,694 B2 | 5/2013 | Kim |
| 8,438,695 B2 | 5/2013 | Gilbert, Jr. |
| 8,438,698 B2 | 5/2013 | Kim |
| 8,447,440 B2 | 5/2013 | Phillips |
| 8,447,613 B2 | 5/2013 | Hussey |
| 8,452,448 B2 | 5/2013 | Pack |
| 8,453,289 B2 | 6/2013 | Lynch |
| 8,456,125 B2 | 6/2013 | Landry |
| 8,461,803 B2 | 6/2013 | Cohen |
| 8,463,438 B2 * | 6/2013 | Jones .................. G05D 1/0219 15/319 |
| 8,473,140 B2 | 6/2013 | Norris |
| 8,474,090 B2 * | 7/2013 | Jones ....................... A47L 5/34 15/319 |
| 8,478,442 B2 | 7/2013 | Casey |
| 8,485,330 B2 | 7/2013 | Pack |
| 8,505,158 B2 | 8/2013 | Han |
| 8,508,388 B2 | 8/2013 | Karlsson |
| 8,515,578 B2 | 8/2013 | Chiappetta |
| 8,516,651 B2 | 8/2013 | Jones |
| 8,525,995 B2 | 9/2013 | Jones |
| 8,527,113 B2 | 9/2013 | Yamauchi |
| 8,528,157 B2 | 9/2013 | Schnittman |
| 8,528,162 B2 | 9/2013 | Tang |
| 8,528,673 B2 | 9/2013 | More |
| 8,532,822 B2 | 9/2013 | Abramson |
| 8,533,144 B1 | 9/2013 | Reeser |
| 8,534,983 B2 | 9/2013 | Schoenfeld |
| 8,543,562 B2 | 9/2013 | Mule |
| 8,548,626 B2 | 10/2013 | Steltz |
| 8,551,254 B2 | 10/2013 | Dayton |
| 8,551,421 B2 | 10/2013 | Luchinger |
| 8,565,920 B2 | 10/2013 | Casey |
| 8,572,799 B2 | 11/2013 | Won |
| 8,584,305 B2 | 11/2013 | Won |
| 8,584,306 B2 | 11/2013 | Chung |
| 8,584,307 B2 | 11/2013 | Won |
| 8,594,840 B1 | 11/2013 | Chiappetta |
| 8,598,829 B2 | 12/2013 | Landry |
| 8,599,645 B2 | 12/2013 | Chiappetta |
| 8,600,553 B2 | 12/2013 | Svendsen |
| 8,606,401 B2 | 12/2013 | Ozick |
| 8,634,956 B1 | 1/2014 | Chiappetta |
| 8,634,958 B1 | 1/2014 | Chiappetta |
| 8,666,523 B2 | 3/2014 | Kim |
| 8,671,513 B2 | 3/2014 | Yoo et al. |
| 8,732,895 B2 | 5/2014 | Cunningham |
| 8,741,013 B2 | 6/2014 | Swett et al. |
| 8,743,286 B2 | 6/2014 | Hasegawa |
| 8,745,194 B2 | 6/2014 | Uribe-Etxebarria Jimenez |
| 8,755,936 B2 | 6/2014 | Friedman |
| 8,761,931 B2 | 6/2014 | Halloran |
| 8,763,200 B2 | 7/2014 | Kim |
| 8,774,970 B2 | 7/2014 | Knopow |
| 8,780,342 B2 * | 7/2014 | DiBernardo ............ G01S 5/163 356/139 |
| 8,798,791 B2 | 8/2014 | Li |
| 8,798,792 B2 | 8/2014 | Park |
| 8,799,258 B2 | 8/2014 | Mule |
| 8,838,274 B2 | 9/2014 | Jones |
| 8,839,477 B2 | 9/2014 | Schnittman |
| 8,843,245 B2 | 9/2014 | Choe |
| 8,855,914 B1 | 10/2014 | Alexander |
| 8,874,264 B1 | 10/2014 | Chiappetta |
| 8,880,342 B2 | 11/2014 | Ando et al. |
| 8,881,339 B2 | 11/2014 | Gilbert, Jr. et al. |
| 8,924,042 B2 | 12/2014 | Kim |
| 8,961,695 B2 | 2/2015 | Romanov |
| 8,985,127 B2 | 3/2015 | Konandreas |
| 8,996,172 B2 | 3/2015 | Shah et al. |
| 9,033,079 B2 | 5/2015 | Shin |
| 9,037,396 B2 | 5/2015 | Pack |
| 9,144,361 B2 | 9/2015 | Landry |
| 9,360,300 B2 | 6/2016 | DiBernado |
| 9,436,185 B2 | 9/2016 | Schnittman |
| 9,687,132 B2 * | 6/2017 | Schlischka ......... A47L 11/4061 |

(56) References Cited

U.S. PATENT DOCUMENTS

| | | |
|---|---|---|
| 10,045,675 B2 | 8/2018 | Haegermarck |
| 10,314,454 B2 | 6/2019 | Kim et al. |
| 2001/0004719 A1 | 6/2001 | Sommer |
| 2001/0037163 A1 | 11/2001 | Allard |
| 2002/0016649 A1 | 2/2002 | Jones |
| 2002/0091466 A1* | 7/2002 | Song ............... A47L 9/009 700/245 |
| 2002/0108635 A1 | 8/2002 | Marrero |
| 2002/0121288 A1 | 9/2002 | Marrero |
| 2002/0121561 A1 | 9/2002 | Marrero |
| 2002/0164932 A1 | 11/2002 | Kamimura |
| 2002/0174506 A1 | 11/2002 | Wallach |
| 2002/0185071 A1 | 12/2002 | Guo |
| 2002/0189871 A1 | 12/2002 | Won |
| 2003/0000034 A1 | 1/2003 | Welsh |
| 2003/0025472 A1 | 2/2003 | Jones |
| 2003/0030398 A1 | 2/2003 | Jacobs |
| 2003/0120972 A1 | 6/2003 | Matsushima |
| 2003/0159223 A1 | 8/2003 | Plankenhorn |
| 2003/0167000 A1 | 9/2003 | Mullick |
| 2003/0229421 A1 | 12/2003 | Chmura |
| 2004/0020000 A1 | 2/2004 | Jones |
| 2004/0031111 A1 | 2/2004 | Porchia |
| 2004/0031121 A1 | 2/2004 | Martin |
| 2004/0034952 A1 | 2/2004 | Ho |
| 2004/0049877 A1 | 3/2004 | Jones |
| 2004/0049878 A1 | 3/2004 | Thomas |
| 2004/0074038 A1 | 4/2004 | Im |
| 2004/0074039 A1 | 4/2004 | Kim |
| 2004/0098167 A1 | 5/2004 | Yi |
| 2004/0111184 A1 | 6/2004 | Chiappetta |
| 2004/0111827 A1 | 6/2004 | Im |
| 2004/0167667 A1 | 8/2004 | Goncalves |
| 2004/0181896 A1 | 9/2004 | Egawa |
| 2004/0182839 A1 | 9/2004 | Denney |
| 2004/0182840 A1 | 9/2004 | Denney |
| 2004/0185011 A1 | 9/2004 | Alexander |
| 2004/0187249 A1 | 9/2004 | Jones |
| 2004/0207355 A1 | 10/2004 | Jones |
| 2004/0208212 A1 | 10/2004 | Denney |
| 2004/0210343 A1 | 10/2004 | Kim |
| 2004/0220707 A1 | 11/2004 | Pallister |
| 2005/0010331 A1 | 1/2005 | Taylor |
| 2005/0015912 A1 | 1/2005 | Kim |
| 2005/0015915 A1 | 1/2005 | Thomas |
| 2005/0028315 A1 | 2/2005 | Thomas |
| 2005/0028316 A1 | 2/2005 | Thomas |
| 2005/0042151 A1 | 2/2005 | Alward |
| 2005/0065662 A1 | 3/2005 | Reindle |
| 2005/0085947 A1 | 4/2005 | Aldred |
| 2005/0088643 A1 | 4/2005 | Anderson |
| 2005/0156562 A1 | 7/2005 | Cohen |
| 2005/0166354 A1 | 8/2005 | Uehigashi |
| 2005/0191949 A1 | 9/2005 | Kamimura |
| 2005/0217061 A1 | 10/2005 | Reindle |
| 2005/0223514 A1 | 10/2005 | Stuchlik |
| 2005/0229340 A1 | 10/2005 | Sawalski |
| 2005/0230166 A1 | 10/2005 | Petersson |
| 2005/0234611 A1 | 10/2005 | Uehigashi |
| 2005/0251292 A1 | 11/2005 | Casey |
| 2005/0251457 A1 | 11/2005 | Kashiwagi |
| 2005/0251947 A1 | 11/2005 | Lee |
| 2005/0267629 A1 | 12/2005 | Petersson |
| 2005/0278888 A1 | 12/2005 | Reindle |
| 2005/0287038 A1 | 12/2005 | Dubrovsky |
| 2006/0009879 A1 | 1/2006 | Lynch |
| 2006/0010799 A1 | 1/2006 | Bohm |
| 2006/0020369 A1 | 1/2006 | Taylor |
| 2006/0020370 A1* | 1/2006 | Abramson ........... G05D 1/0244 700/245 |
| 2006/0028306 A1 | 2/2006 | Hukuba |
| 2006/0032013 A1 | 2/2006 | Kim |
| 2006/0045981 A1 | 3/2006 | Tsushi |
| 2006/0076039 A1 | 4/2006 | Song et al. |
| 2006/0095158 A1 | 5/2006 | Lee |
| 2006/0136096 A1 | 6/2006 | Chiappetta |
| 2006/0144834 A1 | 7/2006 | Denney |
| 2006/0178777 A1 | 8/2006 | Park |
| 2006/0190133 A1 | 8/2006 | Konandreas |
| 2006/0190134 A1 | 8/2006 | Ziegler |
| 2006/0190146 A1 | 8/2006 | Morse |
| 2006/0195015 A1 | 8/2006 | Mullick |
| 2006/0200281 A1 | 9/2006 | Ziegler |
| 2006/0213025 A1 | 9/2006 | Sawalski |
| 2006/0235570 A1 | 10/2006 | Jung |
| 2006/0235585 A1 | 10/2006 | Tanaka |
| 2006/0236492 A1 | 10/2006 | Sudo |
| 2006/0288519 A1 | 12/2006 | Jaworski |
| 2006/0293788 A1 | 12/2006 | Pogodin |
| 2007/0016328 A1 | 1/2007 | Ziegler |
| 2007/0021867 A1 | 1/2007 | Woo |
| 2007/0059441 A1 | 3/2007 | Greer |
| 2007/0061040 A1 | 3/2007 | Augenbraun |
| 2007/0114975 A1 | 5/2007 | Cohen |
| 2007/0118248 A1 | 5/2007 | Lee et al. |
| 2007/0124890 A1 | 6/2007 | Erko |
| 2007/0143950 A1 | 6/2007 | Lin |
| 2007/0156286 A1 | 7/2007 | Yamauchi |
| 2007/0179670 A1 | 8/2007 | Chiappetta |
| 2007/0189347 A1 | 8/2007 | Denney |
| 2007/0204426 A1 | 9/2007 | Nakagawa |
| 2007/0213892 A1 | 9/2007 | Jones |
| 2007/0214601 A1 | 9/2007 | Chung |
| 2007/0234492 A1 | 10/2007 | Svendsen |
| 2007/0244610 A1 | 10/2007 | Ozick |
| 2007/0250212 A1* | 10/2007 | Halloran ............. A47L 5/30 700/245 |
| 2007/0266508 A1 | 11/2007 | Jones |
| 2007/0267230 A1 | 11/2007 | Won |
| 2007/0267570 A1 | 11/2007 | Park |
| 2007/0267998 A1 | 11/2007 | Cohen |
| 2007/0273864 A1 | 11/2007 | Cho |
| 2007/0276541 A1 | 11/2007 | Sawasaki |
| 2007/0285041 A1 | 12/2007 | Jones |
| 2007/0289267 A1 | 12/2007 | Makarov |
| 2007/0290649 A1 | 12/2007 | Jones |
| 2008/0000041 A1 | 1/2008 | Jones |
| 2008/0000042 A1 | 1/2008 | Jones |
| 2008/0001566 A1 | 1/2008 | Jones |
| 2008/0007203 A1 | 1/2008 | Cohen |
| 2008/0009964 A1 | 1/2008 | Bruemmer et al. |
| 2008/0015738 A1 | 1/2008 | Casey |
| 2008/0016631 A1 | 1/2008 | Casey |
| 2008/0037170 A1 | 2/2008 | Saliba |
| 2008/0039974 A1 | 2/2008 | Sandin |
| 2008/0047092 A1 | 2/2008 | Schnittman |
| 2008/0051953 A1 | 2/2008 | Jones |
| 2008/0007193 A1 | 3/2008 | Bow |
| 2008/0052846 A1 | 3/2008 | Kapoor |
| 2008/0058987 A1 | 3/2008 | Ozick |
| 2008/0063400 A1 | 3/2008 | Hudson |
| 2008/0065265 A1 | 3/2008 | Ozick |
| 2008/0077278 A1 | 3/2008 | Park |
| 2008/0084174 A1 | 4/2008 | Jones |
| 2008/0086241 A1 | 4/2008 | Phillips |
| 2008/0091304 A1 | 4/2008 | Ozick |
| 2008/0091305 A1 | 4/2008 | Svendsen |
| 2008/0093131 A1 | 4/2008 | Couture |
| 2008/0098553 A1 | 5/2008 | Dayton |
| 2008/0105445 A1 | 5/2008 | Dayton |
| 2008/0109126 A1 | 5/2008 | Sandin |
| 2008/0121097 A1 | 5/2008 | Rudakevych |
| 2008/0127445 A1 | 6/2008 | Konandreas |
| 2008/0127446 A1 | 6/2008 | Ziegler |
| 2008/0133052 A1 | 6/2008 | Jones |
| 2008/0134457 A1 | 6/2008 | Morse |
| 2008/0134458 A1 | 6/2008 | Ziegler |
| 2008/0140255 A1 | 6/2008 | Ziegler |
| 2008/0143063 A1 | 6/2008 | Won |
| 2008/0143064 A1 | 6/2008 | Won |
| 2008/0143065 A1 | 6/2008 | DeFazio |
| 2008/0152871 A1 | 6/2008 | Greer |
| 2008/0155768 A1 | 7/2008 | Ziegler |
| 2008/0179115 A1 | 7/2008 | Ohm |

(56) References Cited

U.S. PATENT DOCUMENTS

| | | |
|---|---|---|
| 2008/0183332 A1 | 7/2008 | Ohm |
| 2008/0184518 A1 | 8/2008 | Taylor |
| 2008/0196946 A1 | 8/2008 | Filippov |
| 2008/0205194 A1 | 8/2008 | Chiappetta |
| 2008/0209665 A1 | 9/2008 | Mangiardi |
| 2008/0221729 A1 | 9/2008 | Lavarec |
| 2008/0223630 A1 | 9/2008 | Couture |
| 2008/0235897 A1 | 10/2008 | Kim |
| 2008/0236907 A1 | 10/2008 | Won |
| 2008/0264456 A1 | 10/2008 | Lynch |
| 2008/0266254 A1 | 10/2008 | Robbins |
| 2008/0276407 A1* | 11/2008 | Schnittman ............. A47L 11/34 15/319 |
| 2008/0276408 A1 | 11/2008 | Gilbert |
| 2008/0281470 A1 | 11/2008 | Gilbert |
| 2008/0282494 A1 | 11/2008 | Won |
| 2008/0294288 A1 | 11/2008 | Yamauchi |
| 2008/0307590 A1 | 12/2008 | Jones |
| 2009/0007366 A1 | 1/2009 | Svendsen |
| 2009/0025155 A1 | 1/2009 | Nishiyama |
| 2009/0030551 A1 | 1/2009 | Hein et al. |
| 2009/0037024 A1 | 2/2009 | Jamieson |
| 2009/0038089 A1 | 2/2009 | Landry |
| 2009/0044370 A1 | 2/2009 | Won |
| 2009/0045766 A1 | 2/2009 | Casey |
| 2009/0055022 A1 | 2/2009 | Casey |
| 2009/0065271 A1 | 3/2009 | Won |
| 2009/0070946 A1 | 3/2009 | Tamada |
| 2009/0078035 A1 | 3/2009 | Mecca |
| 2009/0107738 A1 | 4/2009 | Won |
| 2009/0125175 A1 | 5/2009 | Park |
| 2009/0126143 A1 | 5/2009 | Haegermarck |
| 2009/0133720 A1 | 5/2009 | Vandenbogert |
| 2009/0145671 A1 | 6/2009 | Filippov |
| 2009/0173553 A1 | 7/2009 | Won |
| 2009/0180668 A1 | 7/2009 | Jones |
| 2009/0226113 A1 | 9/2009 | Matsumoto |
| 2009/0232506 A1 | 9/2009 | Hudson |
| 2009/0241826 A1 | 10/2009 | Vosburgh |
| 2009/0254217 A1 | 10/2009 | Pack |
| 2009/0254218 A1 | 10/2009 | Sandin |
| 2009/0265036 A1 | 10/2009 | Jamieson |
| 2009/0270015 A1 | 10/2009 | DAmbra |
| 2009/0274602 A1 | 11/2009 | Alward |
| 2009/0281661 A1* | 11/2009 | Dooley ................... B60L 50/66 700/258 |
| 2009/0292393 A1 | 11/2009 | Casey |
| 2009/0292884 A1 | 11/2009 | Wang |
| 2009/0314318 A1 | 12/2009 | Chang |
| 2009/0314554 A1 | 12/2009 | Couture |
| 2009/0319083 A1 | 12/2009 | Jones |
| 2010/0001478 A1 | 1/2010 | DeFazio |
| 2010/0011529 A1 | 1/2010 | Won |
| 2010/0037418 A1 | 2/2010 | Hussey |
| 2010/0049364 A1 | 2/2010 | Landry |
| 2010/0049365 A1 | 2/2010 | Jones |
| 2010/0049391 A1 | 2/2010 | Nakano |
| 2010/0063628 A1 | 3/2010 | Landry |
| 2010/0075054 A1 | 3/2010 | Kaneyama |
| 2010/0076600 A1 | 3/2010 | Cross |
| 2010/0078415 A1 | 4/2010 | Denney |
| 2010/0082193 A1 | 4/2010 | Chiappetta |
| 2010/0107355 A1 | 5/2010 | Won |
| 2010/0108098 A1 | 5/2010 | Splinter |
| 2010/0115716 A1 | 5/2010 | Landry |
| 2010/0116566 A1 | 5/2010 | Ohm |
| 2010/0125968 A1 | 5/2010 | Ho |
| 2010/0139029 A1 | 6/2010 | Kim |
| 2010/0139995 A1 | 6/2010 | Rudakevych |
| 2010/0161225 A1 | 6/2010 | Hyung et al. |
| 2010/0173070 A1 | 7/2010 | Niu |
| 2010/0206336 A1 | 8/2010 | Souid |
| 2010/0217436 A1 | 8/2010 | Jones |
| 2010/0257690 A1 | 10/2010 | Jones |
| 2010/0257691 A1 | 10/2010 | Jones |
| 2010/0263142 A1 | 10/2010 | Jones |
| 2010/0263158 A1 | 10/2010 | Jones |
| 2010/0268384 A1 | 10/2010 | Jones |
| 2010/0275405 A1 | 11/2010 | Morse |
| 2010/0286791 A1 | 11/2010 | Goldsmith |
| 2010/0305752 A1 | 12/2010 | Abramson |
| 2010/0312429 A1 | 12/2010 | Jones |
| 2010/0313910 A1 | 12/2010 | Lee |
| 2010/0313912 A1 | 12/2010 | Han |
| 2011/0000363 A1 | 1/2011 | More |
| 2011/0004339 A1 | 1/2011 | Ozick |
| 2011/0010873 A1 | 1/2011 | Kim |
| 2011/0077802 A1 | 3/2011 | Halloran |
| 2011/0082668 A1 | 4/2011 | Escrig |
| 2011/0088609 A1 | 4/2011 | Vosburgh |
| 2011/0109549 A1 | 5/2011 | Robbins |
| 2011/0125323 A1 | 5/2011 | Gutmann et al. |
| 2011/0131741 A1 | 6/2011 | Jones |
| 2011/0154589 A1 | 6/2011 | Reindle |
| 2011/0202175 A1 | 8/2011 | Romanov |
| 2011/0209726 A1 | 9/2011 | Dayton |
| 2011/0252594 A1 | 10/2011 | Blouin |
| 2011/0258789 A1 | 10/2011 | Lavabre |
| 2011/0271469 A1 | 11/2011 | Ziegler |
| 2011/0277269 A1 | 11/2011 | Kim |
| 2011/0286886 A1 | 11/2011 | Luchinger |
| 2011/0288684 A1 | 11/2011 | Farlow |
| 2012/0011668 A1 | 1/2012 | Schnittman |
| 2012/0011669 A1 | 1/2012 | Schnittman |
| 2012/0011676 A1 | 1/2012 | Jung |
| 2012/0011677 A1 | 1/2012 | Jung |
| 2012/0011992 A1 | 1/2012 | Rudakevych |
| 2012/0036659 A1 | 2/2012 | Ziegler |
| 2012/0047676 A1 | 3/2012 | Jung |
| 2012/0049798 A1 | 3/2012 | Cohen |
| 2012/0079670 A1 | 4/2012 | Yoon |
| 2012/0083924 A1 | 4/2012 | Jones |
| 2012/0084934 A1 | 4/2012 | Li |
| 2012/0084937 A1 | 4/2012 | Won |
| 2012/0084938 A1 | 4/2012 | Fu |
| 2012/0085368 A1 | 4/2012 | Landry |
| 2012/0090133 A1 | 4/2012 | Kim |
| 2012/0095619 A1 | 4/2012 | Pack |
| 2012/0096656 A1 | 4/2012 | Jung |
| 2012/0097783 A1 | 4/2012 | Pack |
| 2012/0101661 A1 | 4/2012 | Phillips |
| 2012/0102670 A1 | 5/2012 | Jang |
| 2012/0109423 A1 | 5/2012 | Pack |
| 2012/0110755 A1 | 5/2012 | Liu |
| 2012/0118216 A1 | 5/2012 | Vosburgh |
| 2012/0125363 A1 | 5/2012 | Kim |
| 2012/0137464 A1 | 6/2012 | Thatcher |
| 2012/0137949 A1 | 6/2012 | Vosburgh |
| 2012/0151709 A1 | 6/2012 | Tang |
| 2012/0152280 A1 | 6/2012 | Bosses |
| 2012/0152877 A1 | 6/2012 | Tadayon |
| 2012/0159725 A1 | 6/2012 | Kapoor |
| 2012/0166024 A1 | 6/2012 | Phillips |
| 2012/0167917 A1* | 7/2012 | Gilbert, Jr. ............ A47L 11/408 134/6 |
| 2012/0169497 A1 | 7/2012 | Schnittman |
| 2012/0173018 A1 | 7/2012 | Allen |
| 2012/0173070 A1 | 7/2012 | Schnittman |
| 2012/0180254 A1 | 7/2012 | Morse |
| 2012/0180712 A1 | 7/2012 | Vosburgh |
| 2012/0181099 A1 | 7/2012 | Moon |
| 2012/0182392 A1 | 7/2012 | Kearns |
| 2012/0183382 A1 | 7/2012 | Couture |
| 2012/0185091 A1 | 7/2012 | Field |
| 2012/0185094 A1 | 7/2012 | Rosenstein |
| 2012/0185095 A1 | 7/2012 | Rosenstein |
| 2012/0185096 A1 | 7/2012 | Rosenstein |
| 2012/0192898 A1 | 8/2012 | Lynch |
| 2012/0194395 A1 | 8/2012 | Williams |
| 2012/0197439 A1 | 8/2012 | Wang |
| 2012/0197464 A1 | 8/2012 | Wang |
| 2012/0199006 A1 | 8/2012 | Swett |
| 2012/0199407 A1 | 8/2012 | Morey |
| 2012/0200149 A1 | 8/2012 | Rudakevych |

(56) References Cited

U.S. PATENT DOCUMENTS

| | | |
|---|---|---|
| 2012/0222224 A1 | 9/2012 | Yoon |
| 2012/0246862 A1 | 10/2012 | Landry |
| 2012/0260443 A1 | 10/2012 | Lindgren |
| 2012/0260861 A1 | 10/2012 | Lindgren |
| 2012/0261204 A1 | 10/2012 | Won |
| 2012/0265346 A1 | 10/2012 | Gilbert |
| 2012/0265391 A1 | 10/2012 | Letsky |
| 2012/0268587 A1 | 10/2012 | Robbins |
| 2012/0281829 A1 | 11/2012 | Rudakevych |
| 2012/0298029 A1 | 11/2012 | Vosburgh |
| 2012/0303160 A1 | 11/2012 | Ziegler |
| 2012/0311810 A1 | 12/2012 | Gilbert |
| 2012/0312221 A1 | 12/2012 | Vosburgh |
| 2012/0317745 A1 | 12/2012 | Jung |
| 2012/0322349 A1 | 12/2012 | Josi |
| 2013/0015596 A1 | 1/2013 | Mozeika |
| 2013/0025085 A1 | 1/2013 | Kim |
| 2013/0031734 A1 | 2/2013 | Porat |
| 2013/0032078 A1 | 2/2013 | Yahnker |
| 2013/0035793 A1 | 2/2013 | Neumann |
| 2013/0047368 A1 | 2/2013 | Tran |
| 2013/0054029 A1 | 2/2013 | Huang |
| 2013/0054129 A1 | 2/2013 | Wong |
| 2013/0060357 A1 | 3/2013 | Li |
| 2013/0060379 A1 | 3/2013 | Choe |
| 2013/0070563 A1 | 3/2013 | Chiappetta |
| 2013/0081218 A1 | 4/2013 | Kim |
| 2013/0085603 A1 | 4/2013 | Chiappetta |
| 2013/0086760 A1 | 4/2013 | Han |
| 2013/0092190 A1 | 4/2013 | Yoon |
| 2013/0098402 A1* | 4/2013 | Yoon ............... A47L 11/33 134/18 |
| 2013/0103194 A1 | 4/2013 | Jones |
| 2013/0105233 A1 | 5/2013 | Couture |
| 2013/0117952 A1 | 5/2013 | Schnittman |
| 2013/0118524 A1 | 5/2013 | Konandreas |
| 2013/0138246 A1* | 5/2013 | Gutmann ............ G05D 1/0231 700/253 |
| 2013/0138337 A1 | 5/2013 | Pack |
| 2013/0145572 A1 | 6/2013 | Schregardus |
| 2013/0152724 A1 | 6/2013 | Mozeika |
| 2013/0160226 A1 | 6/2013 | Lee |
| 2013/0166107 A1 | 6/2013 | Robbins |
| 2013/0174371 A1 | 7/2013 | Jones |
| 2013/0204463 A1 | 8/2013 | Chiappetta |
| 2013/0204465 A1 | 8/2013 | Phillips |
| 2013/0204483 A1 | 8/2013 | Sung |
| 2013/0205520 A1 | 8/2013 | Kapoor |
| 2013/0206170 A1 | 8/2013 | Svendsen |
| 2013/0206177 A1* | 8/2013 | Burlutskiy ............ A47L 9/009 134/18 |
| 2013/0211589 A1 | 8/2013 | Landry |
| 2013/0214498 A1 | 8/2013 | DeFazio |
| 2013/0226344 A1 | 8/2013 | Wong |
| 2013/0227801 A1 | 9/2013 | Kim |
| 2013/0227812 A1 | 9/2013 | Kim |
| 2013/0228198 A1 | 9/2013 | Hung |
| 2013/0228199 A1 | 9/2013 | Hung |
| 2013/0231779 A1 | 9/2013 | Purkayastha |
| 2013/0231819 A1 | 9/2013 | Hung |
| 2013/0232702 A1 | 9/2013 | Baek |
| 2013/0239870 A1 | 9/2013 | Hudson |
| 2013/0241217 A1 | 9/2013 | Hickey |
| 2013/0253701 A1 | 9/2013 | Halloran |
| 2013/0256042 A1 | 10/2013 | Rudakevych |
| 2013/0268118 A1 | 10/2013 | Grinstead |
| 2013/0269148 A1 | 10/2013 | Chiu |
| 2013/0273252 A1 | 10/2013 | Miyamoto |
| 2013/0298350 A1 | 11/2013 | Schnittman |
| 2013/0310978 A1 | 11/2013 | Ozick |
| 2013/0317944 A1* | 11/2013 | Huang ............... G01S 5/0252 705/26.61 |
| 2013/0325178 A1 | 12/2013 | Jones |
| 2013/0331987 A1 | 12/2013 | Karlsson |
| 2013/0338525 A1 | 12/2013 | Allen |
| 2013/0338828 A1 | 12/2013 | Chiappetta |
| 2013/0338831 A1 | 12/2013 | Noh |
| 2013/0340201 A1 | 12/2013 | Jang et al. |
| 2014/0016469 A1 | 1/2014 | Ho |
| 2014/0026339 A1 | 1/2014 | Konandreas |
| 2014/0053351 A1 | 2/2014 | Kapoor |
| 2014/0109339 A1 | 4/2014 | Won |
| 2014/0123325 A1 | 5/2014 | Jung |
| 2014/0130272 A1 | 5/2014 | Won |
| 2014/0142757 A1 | 5/2014 | Ziegler |
| 2014/0167931 A1 | 6/2014 | Lee |
| 2014/0180968 A1 | 6/2014 | Song |
| 2014/0184144 A1* | 7/2014 | Henricksen ............ B25J 9/0003 320/107 |
| 2014/0207280 A1 | 7/2014 | Duffley |
| 2014/0207281 A1 | 7/2014 | Angle |
| 2014/0207282 A1 | 7/2014 | Angle |
| 2014/0238440 A1 | 8/2014 | Dayton |
| 2014/0249671 A1 | 9/2014 | Halloran |
| 2014/0283326 A1 | 9/2014 | Song |
| 2015/0000068 A1 | 1/2015 | Tsuboi et al. |
| 2015/0005937 A1 | 1/2015 | Ponulak |
| 2015/0032259 A1 | 1/2015 | Kim |
| 2015/0039127 A1 | 2/2015 | Matsumoto |
| 2015/0057800 A1 | 2/2015 | Cohen |
| 2015/0120056 A1* | 4/2015 | Noh ............... G05D 1/024 700/259 |
| 2015/0185322 A1 | 7/2015 | Haegermarck |
| 2015/0197012 A1 | 7/2015 | Schnittman |
| 2015/0206015 A1 | 7/2015 | Ramalingam |
| 2015/0265122 A1 | 9/2015 | Han et al. |
| 2016/0202703 A1 | 7/2016 | Matsubara |
| 2016/0298970 A1* | 10/2016 | Lindhe ............... G05D 1/0248 |
| 2016/0306359 A1* | 10/2016 | Lindhe ............... G05D 1/0221 |
| 2016/0316982 A1 | 11/2016 | Kim et al. |
| 2017/0273521 A1 | 9/2017 | Klintemyr et al. |
| 2017/0273524 A1 | 9/2017 | Klintemyr et al. |
| 2017/0344013 A1* | 11/2017 | Haegermarck ...... G05D 1/0219 |
| 2018/0103812 A1 | 4/2018 | Lee et al. |

FOREIGN PATENT DOCUMENTS

| | | |
|---|---|---|
| CN | 1668238 A | 9/2005 |
| CN | 1883889 A | 12/2006 |
| CN | 101161174 A | 4/2008 |
| CN | 101297267 A | 10/2008 |
| CN | 102083352 A | 6/2011 |
| CN | 102183959 A | 9/2011 |
| CN | 103027634 | 4/2013 |
| CN | 103054516 A | 4/2013 |
| CN | 103308050 A | 9/2013 |
| CN | 103376801 A | 10/2013 |
| CN | 103491838 A | 1/2014 |
| CN | 103534659 A | 1/2014 |
| CN | 103565373 A | 2/2014 |
| DE | 3536907 | 4/1986 |
| DE | 9307500 | 7/1993 |
| DE | 4211789 | 10/1993 |
| DE | 4340367 | 6/1995 |
| DE | 4439427 A1 | 5/1996 |
| DE | 19849978 | 5/2000 |
| DE | 202008017137 U1 | 3/2009 |
| DE | 102010000174 | 7/2011 |
| DE | 102010000573 | 9/2011 |
| DE | 102010037672 | 3/2012 |
| DE | 2020017000833 | 3/2018 |
| EP | 0142594 | 5/1985 |
| EP | 0358628 | 3/1990 |
| EP | 0474542 | 3/1992 |
| EP | 0569984 | 11/1993 |
| EP | 0606173 | 7/1994 |
| EP | 1099143 | 11/2003 |
| EP | 1360922 A2 | 11/2003 |
| EP | 1441271 | 7/2004 |
| EP | 1331537 | 8/2005 |
| EP | 2050380 | 4/2009 |
| EP | 1969438 | 9/2009 |
| EP | 1395888 | 5/2011 |
| EP | 2316322 | 5/2011 |

(56) References Cited

FOREIGN PATENT DOCUMENTS

| | | |
|---|---|---|
| EP | 2296005 | 6/2011 |
| EP | 2251757 | 11/2011 |
| EP | 2417894 | 2/2012 |
| EP | 2438843 | 4/2012 |
| EP | 2466411 A2 | 6/2012 |
| EP | 2561787 | 2/2013 |
| EP | 2578125 | 4/2013 |
| EP | 2583609 | 4/2013 |
| EP | 2604163 | 6/2013 |
| EP | 2447800 | 4/2014 |
| EP | 2741483 | 6/2014 |
| EP | 2772815 | 9/2014 |
| EP | 2884364 A1 | 6/2015 |
| EP | 2992803 A1 | 3/2016 |
| FR | 2999410 | 6/2014 |
| GB | 1447943 | 9/1976 |
| GB | 2355523 | 4/2001 |
| GB | 2382251 | 5/2003 |
| GB | 2494446 | 3/2013 |
| JP | 5540959 | 3/1980 |
| JP | 6286414 | 4/1987 |
| JP | 62109528 | 5/1987 |
| JP | 62120510 | 6/1987 |
| JP | 62152421 | 7/1987 |
| JP | 62152424 | 7/1987 |
| JP | 63127310 A | 5/1988 |
| JP | 63181727 | 7/1988 |
| JP | 63241610 | 10/1988 |
| JP | 03162814 A | 7/1991 |
| JP | 03166074 | 7/1991 |
| JP | 04260905 | 9/1992 |
| JP | 0584200 | 4/1993 |
| JP | 0584210 | 4/1993 |
| JP | 05084200 | 4/1993 |
| JP | 05189041 | 7/1993 |
| JP | 05224745 | 9/1993 |
| JP | 05228090 | 9/1993 |
| JP | 064133 | 1/1994 |
| JP | 0683442 A | 3/1994 |
| JP | 06125861 | 5/1994 |
| JP | 06144215 | 5/1994 |
| JP | 06179145 | 6/1994 |
| JP | 075922 | 1/1995 |
| JP | 0759695 | 3/1995 |
| JP | 0732752 B2 | 4/1995 |
| JP | 07129239 A | 5/1995 |
| JP | 07281742 | 10/1995 |
| JP | 07287617 A | 10/1995 |
| JP | 08089455 | 4/1996 |
| JP | 08326025 | 12/1996 |
| JP | 0944240 | 2/1997 |
| JP | 09150741 | 6/1997 |
| JP | 09185410 | 7/1997 |
| JP | 11267074 | 10/1999 |
| JP | 2001022443 | 1/2001 |
| JP | 2001187009 | 7/2001 |
| JP | 2002182742 A | 6/2002 |
| JP | 2002287824 A | 10/2002 |
| JP | 2002533797 A | 10/2002 |
| JP | 2002355204 | 12/2002 |
| JP | 2002366228 | 12/2002 |
| JP | 2003505127 A | 2/2003 |
| JP | 2003280740 | 10/2003 |
| JP | 2004096253 | 3/2004 |
| JP | 2004166968 | 6/2004 |
| JP | 2004198212 | 7/2004 |
| JP | 2004303134 A | 10/2004 |
| JP | 2005040597 A | 2/2005 |
| JP | 2005050105 A | 2/2005 |
| JP | 2005124753 A | 5/2005 |
| JP | 2005141636 A | 6/2005 |
| JP | 2005314116 A | 11/2005 |
| JP | 2006015113 A | 1/2006 |
| JP | 2006087507 | 4/2006 |
| JP | 2006185438 A | 7/2006 |
| JP | 2006231477 | 9/2006 |
| JP | 2006314669 | 11/2006 |
| JP | 2007014369 A | 1/2007 |
| JP | 2007070658 | 3/2007 |
| JP | 2007143645 A | 6/2007 |
| JP | 2007213236 A | 8/2007 |
| JP | 2007226322 A | 9/2007 |
| JP | 2007272665 A | 10/2007 |
| JP | 2008132299 A | 6/2008 |
| JP | 2008146617 A | 6/2008 |
| JP | 2008290184 | 12/2008 |
| JP | 2008543394 A | 12/2008 |
| JP | 2009500741 A | 1/2009 |
| JP | 2009509220 | 3/2009 |
| JP | 2009193240 A | 8/2009 |
| JP | 2010507169 A | 3/2010 |
| JP | 2010079869 A | 4/2010 |
| JP | 2010526594 | 8/2010 |
| JP | 2010534825 A | 11/2010 |
| JP | 2011045694 | 3/2011 |
| JP | 2011253361 A | 12/2011 |
| JP | 2012216051 A | 11/2012 |
| JP | 2013041506 A | 2/2013 |
| JP | 2013089256 A | 5/2013 |
| JP | 2013247986 A | 12/2013 |
| JP | 2014023930 A | 2/2014 |
| KR | 20040096253 | 11/2004 |
| KR | 20050003112 | 1/2005 |
| KR | 20070070658 | 7/2007 |
| KR | 20090028359 | 3/2009 |
| KR | 101231932 | 3/2013 |
| NL | 7408667 | 1/1975 |
| WO | 8804081 | 6/1988 |
| WO | 9303399 | 2/1993 |
| WO | 9638770 | 12/1996 |
| WO | 0036961 | 6/2000 |
| WO | 0036970 | 6/2000 |
| WO | 0038025 | 6/2000 |
| WO | 0182766 A2 | 11/2001 |
| WO | 03022120 | 3/2003 |
| WO | 03024292 | 3/2003 |
| WO | 2004006034 A2 | 1/2004 |
| WO | 2004082899 | 9/2004 |
| WO | 2007008148 | 1/2007 |
| WO | 2007028049 | 3/2007 |
| WO | 2007051972 | 5/2007 |
| WO | 2007065034 | 6/2007 |
| WO | 2008048260 | 4/2008 |
| WO | 2009132317 | 10/2009 |
| WO | 2013105431 | 7/2013 |
| WO | 2013157324 | 10/2013 |
| WO | 2014033055 | 3/2014 |
| WO | 2014151501 A1 | 9/2014 |
| WO | 2015016580 | 2/2015 |

OTHER PUBLICATIONS

European Communication Pursuant to Article 94(3) for European Application No. 16176479.0, dated Nov. 27, 2017, 6 pages.
Notice of Allowance for U.S. Appl. No. 14/409,291, dated Sep. 18, 2017, 8 pages.
Notice of Reasons for Rejection for Japanese Application No. 2016-526764, dated Aug. 25, 2017 with translation, 6 pages.
Notification of Reasons for Rejection for Japanese Application No. 2016-526765, dated Aug. 25, 2017 with translation, 7 pages.
Notifcation of Reasons for Refusal for Japanese Application No. 2016-526756, dated Aug. 10, 2017 with translation, 6 pages.
Notification of Reasons for Refusal for Japanese Application No. 2016-526759, dated Aug. 24, 2017 with translation, 9 pages.
Extended European Search Report for European Application No. 18157403.9, dated Nov. 14, 2018, 12 pages.
Report of Reconsideration by Examiner before Appeal for Japanese Application No. 2016-526875, dated Oct. 24, 2018, 2 pages.
Final Office Action for U.S. Appl. No. 15/101,235, dated Jan. 11, 2019, 12 pages.
Notice of Allowance for U.S. Appl. No. 14/784,106, dated Oct. 11, 2018, 7 pages.

(56) References Cited

OTHER PUBLICATIONS

Non Final Office Action for U.S. Appl. No. 15/321,333, dated Oct. 24, 2018, 10 pages.
Position_Definition of Position by Merriam-Webster.pdf (Position | Definition of Position by Merriam-Webster, Oct. 16, 2018, Merriam-Webster, https://www.merriam-webster.com/dictionary/position, pp. 1-15.
Gutman et al., AMOS: Comparison of Scan Matching Approaches for Self-Localization in Indoor Environments, 1996, IEEE, pp. 61-67.
Non Final Office Action for U.S. Appl. No. 15/504,071, dated Nov. 2, 2018, 17 pages.
Notification of Reasons for Refusal of Japanese Application No. 2016-568949, dated Oct. 1, 2018 with translation, 6 pages.
Non Final Office Action for U.S. Appl. No. 15/504,066, dated Nov. 5, 2018, 18 pages.
Non Final Office Action for U.S. Appl. No. 15/101,235, dated Nov. 1, 2017, 11 pages.
Non Final Office Action for U.S. Appl. No. 15/100,667, dated Nov. 29, 2017, 22 pages.
Non Final Office Action for U.S. Appl. No. 14/784,106, dated Oct. 19, 2017, 11 pages.
Final Office Action for U.S. Appl. No. 15/101,212, dated Oct. 11, 2017, 7 pages.
Chinese Office Action for Chinese Application No. 201380075510.9, dated Oct. 27, 2017 with translation, 13 pages.
Notification of Reasons for Refusal for Japanese Application No. 2016-526945, dated Oct. 31, 2017 with translation, 8 pages.
Notification of Reasons for Refusal for Japanese Application No. 2016-526875, dated Oct. 31, 2017 with translation, 10 pages.
Notice of Reasons for Rejection for Japanese Applciation No. 2016-526947, dated Sep. 21, 2017 with translation, 8 pages.
Notice of Allowance for U.S. Appl. No. 15/102,015, dated Dec. 11, 2017, 8 pages.
"SM51 Series Opposed Mode Sensors, DC sensors with metal housings: SM51EB/RB, SM51EB6/RB6", Banner Engineering Corporation, pp. 1-24.
Andersson, et al., "ISR: An Intelligent Service Robot", Centre for Autonomous Systems, Royal Institute of Technology, S-100 44 Stockholm, Sweden, pp. 1-24.
Berlin, et al. "Development of a Multipurpose Mobile Robot for Concrete Surface Processing", A Status Report, Feb. 1992, Sweden, pp. 1-10.
Borenstein, et al. "Real-Time Obstacle Avoidance for Fast Mobile Robots", IEEE, Jan. 6, 1996, pp. 1-18.
Braunstingl, et al., "Fuzzy Logic Wall Following of a Mobile Robot Based on the Concept of General Perception", ICAR '95, 7th International Conference on Advanced Robotics, Sant Feliu De Guixols, Spain pp. 367-376., Sep. 1995, pp. 1-9.
Caselli, et al. "Mobile Robot Navigation in Enclosed Large-Scale Space", Italy and U.S.A., pp. 1-5.
Cassens, et al. "Finishing and Maintaining Wood Floors", Wood Finishing, North Central Regional Extension Publication #136, pp. 1-8.
Chinese Office Action for Chinese Application No. 20130075510.9, dated Feb. 6, 2017 with translation, 14pages.
Chinese Office Action for Chinese Application No. 201380075503.9, dated Feb. 13, 2017 with translation, 18 pages.
Chung etal.,"Path Planning for a Mobile Robot With Grid Type World Model", Proceedings of the 1992 IEEE/RSJ International Conference on Intelligent Robots and Systems,Jul. 7-10, 1992, pp. 439-444.
Collins, et al. "Cerebellar Control of a Line Following Robot", Computer Science and Electrical Engineering Department, University of Queensland, St.Lucia, Queensland, 4072 A, pp. 1-6.
Doty, et al. "Sweep Strategies for a Sensory-Driven, Behavior-Based Vacuum Cleaning Agent", 1993, Machine Intelligence Laboratory—Gainesville Florida, AAAI 1993 Fall Symposium Series—Research Triangle Park—Raleigh, NC, Oct. 22-24, 1993, pp. 1-6.

Everett, Sensors for Mobile Robots Theory and Application, A.K. Peters, 1995, Chapters 1 and 3, 70pages.
Everett, Sensors for Mobile Robots Theory and Application, A.K. Peters, Ltd., 1995, Chapters 15 and 16, 59pages.
Everett, Sensors for Mobile Robots Theory and Application, A.K. Peters, Ltd., 1995, Chapters 6, 7 and 10, 79pages.
Everett, Sensors for Mobile Robots Theory and Application, A.K. Peters, Ltd., 1995, Chapters, 4a nd 5, 68pages.
Everett, et al. "Survey of Collision Avoidance and Ranging Sensors for Mobile Robots", Revision 1, Technical Report 1194, Dec. 1992, pp. 1-154.
Extended European Search Report for European Application No. 16176479.0, dated Nov. 11, 2016, 9pages.
Final Office Action for U.S. Appl. No. 14/409,291, dated Jun. 6, 2017, 21 pages.
Final Office Action for U.S. Appl. No. 15/100,667, dated Apr. 21, 2017, 26 pages.
Gavrilut, et al., "Wall-Following Method for an Autonomous Mobile Robot using Two IR Sensors", 12th WSEAS International Conference on Systems, Heraklion, Greece, Jul. 22-24, 2008, ISBN: 978-960-6766-83-1, ISSN: 1790-2769, pp. 205-209.
Herbst, et al., "Micromouse Design Specifications", Jun. 2, 1998, pp. 1-22.
International Preliminary Report on Patentability for International Application No. PCT/EP2013/077377, dated Jun. 21, 2016, 12 pages.
International Preliminary Report on Patentability for International Application No. PCT/EP2013/077378, dated Jun. 21, 2016, 7 pages.
International Preliminary Report on Patentability for International Application No. PCT/EP2013/077384, dated Jun. 21, 2016, 6 pages.
International Preliminary Report on Patentability for International Application No. PCT/EP2013/077385, dated Jun. 21, 2016, 7 pages.
International Preliminary Report on Patentability for International Application No. PCT/EP2013/077386, dated Jun. 21, 2016, 6 pages.
International Preliminary Report on Patentability for International Application No. PCT/EP2013/077387, dated Jun. 21, 2016, 9 pages.
International Preliminary Report on Patentability for International Application No. PCT/EP2013/077657, dated Jun. 21, 2016, 7 pages.
International Preliminary Report on Patentability for International Application No. PCT/EP2013/077661, dated Jun. 21, 2016, 11 pages.
International Preliminary Report on Patentability for International Application No. PCT/EP203/077380, dated Jun. 21, 2016, 6 pages.
International Search Report and Written Opinion of the International Searching Authority fo rInternatonal Applicaion No. PCT/EP2014/0077142, dated Sep. 11, 2015, 8 pages.
International Search Report and Written Opinion of the International Searching Authority for *International Application No. PCT/EP2015/058377, dated Aug. 10, 2016, 15 pages.
International Search Report and Written Opinion of the International Searching Authority for International Application No. PCT/EP2014/069073, dated May 12, 2015, 10pages.
International Search Report and Written Opinion of the International Searching Authority for International Application No. PCT/Ep2012/077377, dated Nov. 6, 2014, 18 pages.
International Search Report and Written Opinion of the International Searching Authority for International Application No. PCT/EP2013/077378, dated Apr. 9, 2014, 9 pages.
International Search Report and Written Opinion of the International Searching Authority for International Application No. PCT/EP2013/077380, dated Jul. 28, 2014, 8 pages.
International Search Report and Written Opinion of the International Searching Authority for International Application No. PCT/EP2013/077384, dated Aug. 14, 2016, 9 pages.
International Search Report and Written Opinion of the International Searching Authority for International Application No. PCT/EP2013/077385, dated May 27, 2015, 9 pages.
International Search Report and Written Opinion of the International Searching Authority for International Application No. PCT/EP2013/077386, dated Sep. 17, 2014, 9 pages.
International Search Report and Written Opinion of the International Searching Authority for International Application No. PCT/EP2013/077387, dated Sep. 30, 2014, 12 pages.

(56) References Cited

OTHER PUBLICATIONS

International Search Report and Written Opinion of the International Searching Authority for International Application No. PCT/EP2013/077661, dated Jun. 10, 2014, 15 pages.
International Search Report and Written Opinion of the International Searching Authority for International Application No. PCT/EP2014/069074, dated May 11, 2015, 9 pages.
International Search Report and Written Opinion of the International Searching Authority for International Application No. PCT/EP2014/077549, dated Jul. 27, 2015, 9 pages.
International Search Report and Written Opinion of the International Searching Authority for International Application No. PCT/EP2014/077947, dated Jul. 11, 2016, 14 pages.
International Search Report and Written Opinion of the International Searching Authority for International Application No. PCT/EP2014/077954, dated Oct. 12, 2015, 19pages.
International Search Report and Written Opinion of the International Searching Authority for International Application No. PCT/EP2014/078144, 7 pages.
International Search Report and Written Opinion of the International Searching Authority for International Application No. PCT/EP32013/077657, dated Aug. 18, 2014, 10 pages.
International Search Report for International Application No. PCT/EP2013/057814 dated Dec. 20, 2013, 5pages.
International Search Report for International Application No. PCT/EP2013/057815 dated Apr. 12, 2014, 4 pages.
International Search Report for International Application No. PCT/EP2013/067500 dated Dec. 10, 2013, 4pages.
Japanese Office Action for Application for Japanese Application No. 2015-528969, dated Apr. 7, 2017 with translation, 4 pages.
Japanese Office Action for Japanese Application No. 2016-506794, dated Feb. 7, 2017 with translation, 10 pages.
Japanese Office Action for Japanese Application No. 2016-506795, dated Feb. 7, 2017 with translation, 6 pages.
Jenkins, "Practical Requirements for a Domestic Vacuum-Cleaning Robot", From: AAAI Technical Report FS-93-03., JRL Consulting, Menlo Park, California, pp. 85-90.
Jones et al., Mobile Robots Inspiration to Implementation, Second Edition, A.K. Peters, Ltd., 1999, Chapters 1 and 5, 72pages.
Jones etal., Mobile Robots Inspiration to Implementation, Second Edition, A.K. Peters ,Ltd., 1999, Chapters 6 and 9, 56pages.
Jones etal., Mobile Robots Inspiration to Implementation, Second Edition, A.K. Peters, Ltd., 1999, Chapters 10 and 11, 45pages.
Jung, et al. "Whisker Based Mobile Robot Navigation", Wollongong, NSW 2500, Australia, pp. 1-8.
Krishna, et al., "Solving the Local Minima Problem for a Mobile Robot by Classification of Spatio-Temporal Sensory Sequences", Journal of Robotic Systems 17 (10), 2000, pp. 549-564.
Kube, "A Minimal Infrared Obstacle Detection Scheme", Department of Computing Science, University of Alberta, Edmonton, Alberta, Canada, The Robotics Practitioner, 2(2): 15-20, 1996, Oct. 23, 1998, pp. 1-8.
Larson, "RoboKent—a case study in man-machine interfaces" Industrial Robot, vol. 25 No. 2, 1998, pp. 95-100.
LeBouthillier, "W. Grey Walter and his Turtle Robots", The Robot Builder, vol. Eleven No. Five, May 1999, RSSC POB 26044, Santa Ana,CA, pp. 1-8.
Maaref,etal."Sensor-based navigation of a mobile robot in an indoor environment", Robotics and Autonomous Systems, 2002, Elsevier, 18pages.
Michael Carsten Bosse, "Atlas: A Framework for Large Scale Automated Mapping and Localization", Massachusetts Institute of Technology, Feb. 2004, Part 2, 67 pages.
Michael Carsten Bosse, "Atlas: A Framework for Large Scale Automated Mapping and Localization", Massachusetts Institute of Technology, Feb. 2004, Part 1, 140 pages.
Non Final Office Action for U.S. Appl. No. 14/409,291, dated Dec. 28, 2016, 61pages.
Non Final Office Action for U.S. Appl. No. 15/100,667, dated Sep. 12, 2016, 24 pages.

Non Final Office Action for U.S. Appl. No. 15/101,212, dated May 17, 2017, 8 pages.
Non Final Office Action for U.S. Appl. No. 15/101,235 dated Apr. 21, 2017, 10 pages.
Non Final Office Action for U.S. Appl. No. 15/101,257, dated Feb. 10, 2017, 10 pages.
Non Final Office Action for U.S. Appl. No. 15/102,015, dated Aug. 17, 2017, 13 pages.
Notice of Allowance for U.S. Appl. No. 14/409,291, dated Jun. 16, 2016, 13 pages.
Notice of Allowance for U.S. Appl. No. 15/101,257, dated Jul. 6, 2017, 9 pages.
Oren, Reply to Office Action dated Jun. 23, 2014, U.S. Appl. No. 13/757,985, pp. 1-10.
Pack, et al., "Constructing a Wall-Follower Robot for a Senior Design Project", 1996 ASEE Annual Conference Proceedings, Session 1532, pp. 1-7.
Saffiotti, "Fuzzy logic in Autonomous Robot Navigation", a case study, Nov. 1995 Revised: Aug. 1997, IRIDIA, Universite Libre de Bruxelles, Belgium, , Technical Report TR/IRIDIA/ 95 25, Cover page + pp. 1-14.
Written Opinion for International Application No. PCT/EP2013/067500 dated Dec. 10, 2013, 7pages.
Yamamoto, "SOZZY: A Hormone-Driven Autonomous Vacuum Cleaner", From: AAAI Technical Report FS-93-03, Matasushita Research Institute, Tokyo, and MIT Artificial Intelligence laboratory, Massachusetts, pp. 116-124 + Figure 9 and Figure 11.
Notice of Allowance for U.S. Appl. No. 15/102,295, dated Sep. 24, 2018, 9 pages.
Notice of Allowance for U.S. Appl. No. 15/101,515, dated Aug. 28, 2018, 11 pages.
International Search Report and Written Opinion of the International Searching Authority for International Application No. PCT/EP2016/060565, dated Feb. 15, 2017, 12 pages.
International Search Report and Written Opinion of the International Searching Authority for International Application No. PCT/EP2016/060571, dated Feb. 7, 2017, 8 pages.
Non Final Office Action for U.S. Appl. No. 15/101,515, dated Apr. 18, 2018, 14 pages.
Notice of Allowance for U.S. Appl. No. 15/101,212, dated Apr. 11, 2018, 9 pages.
Final Office Action for U.S. Appl. No. 14/784,106, dated Mar. 28, 2018, 8 pages.
Final Office Action for U.S. Appl. No. 15/100,667, dated Mar. 27, 2018, 22 pages.
Notification of Reasons for Refusal for Japanese Application No. 2017-501374, dated Mar. 6, 2018 with translation, 8 pages.
Chinese Office Action for Chinese Application No. 201380081535.X, dated Mar. 26, 2018 with translation, 18 pages.
Chinese Office Action for Chinese Application No. 201380081103.9, dated Feb. 27, 2018 with translation, 19 pages.
International Search Report and Written Opinion for International Application No. PCT/EP2015/070140, dated May 27, 2016, 11 pages.
European Communication Pursuant to Article 94(3) for European Application No. 13817911.4, dated Jan. 15, 2018, 8 pages.
Non Final Office Action for U.S. Appl. No. 15/102,017, dated Feb. 16, 2018, 12 pages.
International Search Report and Written Opinion of the International Searching Authority for International Application No. PCT/E2016/072291, dated Jun. 6, 2017, 11 pages.
Non Final Office Action for U.S. Appl. No. 15/102,017, dated Jan. 22, 2019, 15 pages.
Final Office Action for U.S. Appl. No. 15/101,510, dated Feb. 8, 2019, 16 pages.
International Search Report and Written Opinion for International Application No. PCT/EP2016/055547, dated Jan. 2, 2017, 10 pages.
Notice of Allowance for U.S. Appl. No. 15/100,667,dated Aug. 6, 2018, 10 pages.
Non Final Office Action for U.S. Appl. No. 15/101,510, dated Jul. 27, 2018, 17 pages.
Non Final Office Action for U.S. Appl. No. 14/784,110, dated Aug. 16, 2018, 13 pages.

(56) References Cited

OTHER PUBLICATIONS

Chinese Office Action for Chinese Application No. 201380081537.9, dated Jun. 4, 2018 with translation, 15 pages.
Final Office Action for U.S. Appl. No. 15/102,017, dated Jun. 14, 2018, 12 pages.
Non Final Office Action for U.S. Appl. No. 15/101,235, dated Jun. 14, 2018, 11 pages.
Chinese Office Action for Chinese Application No. 201380081331.6, dated Mar. 26, 2018 with translation, 27 pages.
Decision of Refusal for Japanese Application No. 2016-526945, dated May 15, 2018 with translation, 5 pages.
Decision of Refusal for Japanese Application No. 2016-526875, dated May 15, 2018 with translation, 6 pages.
Notification of Reasons for Refusal for Japanese Application No. 2016-526765, dated May 15, 2018 with translation, 6 pages.
Non Final Offie Action for U.S. Appl. No. 15/535,244, dated May 17, 2019, 6 pages.
Yoshida et al., "Online Motion Planning Using Path Deformation and Replanning", 28th Annual Robot Society, 2011, vol. 29, No. 8, Chapter 3, pp. 716-725 with partial translation, 10 pages.
Japanese Notice of Reasons for Refusal for Japanese Application No. 2017-522557, dated Jun. 18, 2019, 6 pages.
Chinese Office Action for Chinese Application No. 201480084065.7, dated Sep. 16, 2019 with translation, 16 pages.
Notice of Allowance for U.S. Appl. No. 15/535,244, dated Sep. 10, 2019, 5 pages.
International Search Report and Written Opinion for International Application No. PCT/EP2017/072267, dated Jun. 6, 2018, 9 pages.

\* cited by examiner

CLEANING METHOD FOR A ROBOTIC CLEANING DEVICE

This application is a U.S. National Phase application of PCT International Application No. PCT/EP2014/077954, filed Dec. 16, 2014, which is incorporated by reference herein.

TECHNICAL FIELD

The invention relates to a robotic cleaning device and to a method of operating the robotic cleaning device for improving cleaning efficiency.

BACKGROUND

In many fields of technology, it is desirable to use robots with an autonomous behaviour such that they can freely move around a space without colliding with possible objects and obstacles.

Robotic vacuum cleaners or robotic floor mops, further referred to as robotic cleaning devices, are known in the art and usually equipped with drive means in the form of one or more motors for moving the cleaner across a surface to be cleaned. The robotic cleaning devices may further be equipped with intelligence in the form of microprocessor(s) and navigation means for causing an autonomous behaviour such that the robotic vacuum cleaners can freely move around and clean a space in the form of e.g. a room. Thus, these prior art robotic vacuum cleaners have the capability of more or less autonomously vacuum clean or mop a room, in which furniture such as tables, chairs and other objects such as walls and stairs are located.

There are basically two categories of robotic cleaning devices known in the prior art;—the ones which clean a surface by random motion and the ones which navigate on the surface using various sensor data.

The robotic cleaning devices, which use a random motion also look randomly for the charger. These robotic cleaning devices navigate and clean by principle of contingency. Such robotic cleaning devices may comprise a collision sensor to avoid collisions when cleaning. Typically they comprise means to detect and locate the charger when they happen to pass it or when the charger comes into the field of view. This is obviously not a very efficient way of cleaning and navigating and may in particular not work very well for large surfaces or for complicated layouts.

The other type of prior art robotic cleaning devices, which navigate using sensor data deduce from the sensor data where they can safely drive without colliding with objects or obstacles. As they make assumptions about their environment based on the sensor data, which is in most cases not complete, they run a high risk of getting stuck or lost. In addition, extracting data and thus making assumptions from the sensor data additionally requires expensive electronic components.

In some cases prior art robotic cleaning devices use a stroke method to clean, which means they drive back and forth stroke by stroke in order to clean a surface. When navigating such a prior robotic cleaning device from one room to another or back to the charger, the robotic cleaning device uses sensor data to navigate. The risk of collision with objects or obstacles is then comparably high, since such robotic cleaning devices are also forced to make assumptions based on the sensor data. This may slow down the robotic cleaning device and thus reduce the efficiency of the cleaning. Additionally a stroke by stroke method may leave a substantial amount of debris or dust remaining, for example close to edges of objects or obstacles. The cleaning may not be neat.

Some known robotic cleaning devices may comprise a side brush arranged close to or at a left or right periphery of a cleaning opening in order to brush debris and dust into and in front of the cleaning opening. When a side brush, in particular only one side brush, is installed on the robotic cleaning device, the cleaning pattern needs to be adapted accordingly to make sure that the side brush is removing the debris and dust in an optimal way.

SUMMARY

An object of the present invention is to provide a method for operating a robotic cleaning device and a robotic cleaning device configured to perform the method, which method is neat, efficient and robust.

The inventors of the present invention have realized that it is possible to provide a universal method for efficiently operating a robotic cleaning device to provide a neat and tidy cleaning. The method enhances robustness of the navigation of the robotic cleaning device and improves the overall performance of the cleaning.

Disclosed herein is a method of operating a robotic cleaning device over a surface to be cleaned, the method being performed by the robotic cleaning device, the method comprising the steps of:

following a boundary of a first object while registering path markers at intervals on the surface, the path markers comprising positional information;

tracing previously registered path markers at an offset upon encountering one or more of the previously registered path markers; and switching from tracing the previously registered path markers to following an edge of a second object upon detection of the second object.

This method allows the robotic cleaning device to clean according to an inward cleaning pattern or an outward cleaning pattern. The robotic cleaning device may thus start a cleaning of a surface to be cleaned by following a boundary of a first object, such as a wall or the like, and move towards the inside of the surface by cleaning inwards in a spiral pattern or it may detect an second object arranged somewhere away from the boundary of the surface, thus within the surface, and start cleaning by following the edge of said second object and clean by moving outwards from the second object in a spiral pattern.

The first and second objects may be furniture, walls, staircases, elevator shafts, etc. In many cases the first object may be a wall of a room and the second object may be furniture.

The intervals may either be time intervals or distance intervals.

The offset may be smaller than a width of the robotic cleaning device and a cleaning portion of the robotic cleaning device, respectively.

Advantageously, the robotic cleaning device is following the edge of the second object until previously registered path markers are again encountered.

When previously registered path markers are encountered, the robotic cleaning device will realize that either the second obstacle was fully encircled or that one of the sides of the second obstacle was previously cleaned and will thus switch again to follow the previously deposited path markers.

This may allow the robotic cleaning device to build a map graph comprising all encountered objects during cleaning.

In another embodiment the robotic cleaning device may follow the edge of the second object until the second object is encircled.

Thus the robotic cleaning device may continue to follow the second object even if previously registered path markers are encountered upon doing so. As soon as the second object is entirely encircled the robotic cleaning device will again follow or trace previously deposited path markers at an offset.

The steps of tracing and switching to boundary or edge following allows the robotic cleaning device to move over a surface to be cleaned in autonomous and efficient manner and moreover ensure a neat and tidy cleaning, even when objects are encountered.

In another preferred embodiment the method comprises the step of recognizing a loop defining an area to be cleaned upon encountering one or more of the previously registered path markers, wherein the loop comprises a plurality of the previously registered path markers.

Depending on the loop shape the cleaning pattern of the remaining surface may be adapted. Upon recognition the loop may be closed. For example, only the loop that is currently followed and registered by the robotic cleaning device may be open and considered active by the robotic cleaning device.

Preferably the loop is simplified within the map graph, upon recognition for generating an efficient and simple cleaning pattern.

This may improve the navigation and the efficiency of the cleaning of the robotic cleaning device since already cleaned areas may be avoided and multiple cleaning of the same areas, for example in corridors or bottlenecks, can be avoided.

The simplification may comprise the step of closing and/or splitting the loop into a plurality of loops defining a plurality of areas to be cleaned, so that the robotic cleaning device can clean the areas one after the other.

When a surface to be cleaned for instance comprises two rooms being interconnected by a corridor, the loop may be divided, when a first long along the boundaries of the two rooms has been completed, into two loops, one for each room. Each loop may define an area to be cleaned and the robotic cleaning device may clean the two areas one after the other.

Such a simplification avoids multiple strokes over an area that was previously cleaned, in the above case for example the corridor, and it reduces complexity for the robotic cleaning device.

The simplification may alternatively comprise a completion of a loop, if it is safe to assume that there is no object or obstacle involved in the completion.

Additionally the simplification may involve the splitting up of a surface to be cleaned after a first loop has been completed by guiding the robotic cleaning device along a borderline that separates the surface, when it is detected that the surface is larger than a threshold value.

In an embodiment a first area of the plurality of areas may be considered clean when the robotic cleaning device is encountering previously registered path markers when moving in any direction without being able to establish the offset to any of the previously registered path markers.

When all path markers of the previously registered path markers around a currently registered path marker are closer to the robotic cleaning device than the offset, it is safe to assume that the first area has been entirely cleaned and thus finished.

If the above is not the case the robotic cleaning device will move towards the area where previously registered path markers are still spaced apart more than the offset and continue cleaning.

Further, the method may comprise the step of avoiding entering areas where the distance between previously registered path markers is less than the offset.

When the first area to be cleaned from the area of the plurality of areas may be considered finished, the robotic cleaning device may move to a second area to be cleaned of the plurality of areas and staring to trace previously registered path markers of the loop defining the second area to be cleaned.

The robotic cleaning device may thus work step by step by finishing each area until no area is left.

In a preferred embodiment path markers may be registered at a left or right periphery of the robotic cleaning device or the cleaning opening of the robotic cleaning device, as seen in a direction of movement of the robotic cleaning device.

In another embodiment the robotic cleaning device may follow the left or right path markers with a right or left periphery of the robotic cleaning device or the cleaning portion of the robotic cleaning device, as seen in a direction of movement of the robotic cleaning device.

In particular, if a side brush is installed on the robotic cleaning device, the robotic cleaning device may follow the path markers with the side brush when encountering previously registered path markers.

In a further embodiment the robotic cleaning device may follow the boundary or the edge of the first and second object so that the path markers are registered on the periphery of the robotic cleaning device or the cleaning portion of the robotic cleaning device that is located away from the boundary or the edge.

The above may apply depending if the robotic cleaning device is cleaning counter-clockwise or clockwise and if a side brush is installed or not. If a side brush is installed it is advantageous if the side brush is following the boundary or edge of the first or second object. The robotic cleaning device may thus be configured to change the cleaning pattern to counter-clockwise or clockwise to ensure that the side brush is following the edge or boundary of the object when an object is encountered.

The registering of path markers may be started when a corner of the first object is detected.

This may somewhat simplify the cleaning pattern, as described later herein.

Herein is also disclosed a robotic cleaning device comprising a main body, a propulsion system arranged to move the robotic cleaning device, a contact detecting portion connected to the main body and arranged to detect if the robotic cleaning device is in contact with an object and a dead reckoning sensor operatively connected to the propulsion system. The robotic cleaning device may further comprise a processing unit arranged to control the propulsion system, whereby the processing unit may be connected to the dead reckoning sensor and configured to perform the method comprising any of the previously described steps and/or features.

Disclosed herein is further a computer program comprising computer-executable instructions for causing a robotic cleaning device to perform the method comprising any of the previously described steps and/or features, when the computer-executable instructions are executed on a processing unit included in the robotic cleaning device.

Disclosed is further a computer program product comprising a computer readable storage medium, the computer readable storage medium having the computer program according to the above embodied therein.

Generally, all terms used in the claims are to be interpreted according to their ordinary meaning in the technical field, unless explicitly defined otherwise herein. All references to "a/an/the element, apparatus, component, means, device, step, etc." are to be interpreted openly as referring to at least one instance of the element, apparatus, component, means, device, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 6b schematically illustrates how loops are simplified in an environment according to FIG. 6a;

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

The invention relates to robotic cleaning devices, or in other words, to automatic, self-propelled machines for cleaning a surface, e.g. a robotic vacuum cleaner, a robotic sweeper or a robotic floor washer. The robotic cleaning device 10 according to the invention can be mains-operated and have a cord, be battery-operated or use any other kind of suitable energy source, for example solar energy.

Figure 1:
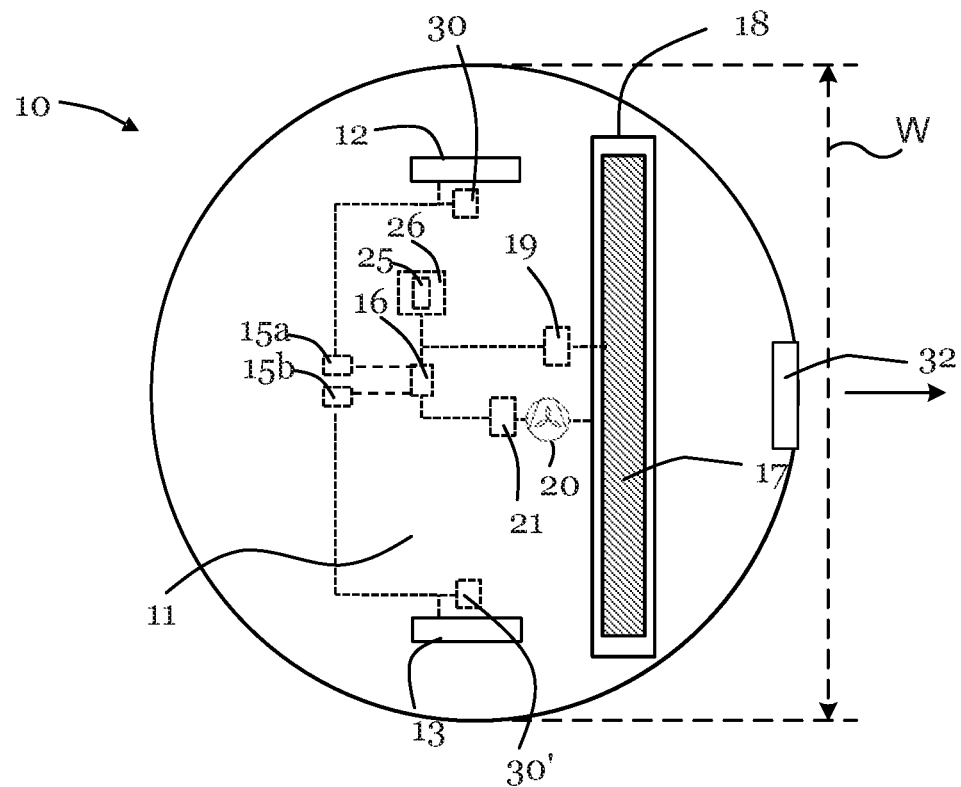
FIG. 1 schematically illustrates a top down view onto an embodiment of a robotic cleaning device according to the invention.

FIG. 1 shows a robotic cleaning device 10 according to an embodiment of the present invention in a bottom view, i.e. the bottom side of the robotic cleaning device 10 is shown. The arrow indicates the forward direction of the robotic cleaning device. The robotic cleaning device 10 comprises a main body 11 housing components such as a propulsion system comprising driving means in the form of two electric wheel motors 15a, 15b for enabling movement of the driving wheels 12, 13, such that the robotic cleaning device 10 can be moved over a surface to be cleaned. Each wheel motor 15a, 15b is capable of controlling the respective driving wheel 12, 13 to rotate independently of each other in order to move the robotic cleaning device 10 across a surface to be cleaned. A number of different driving wheel arrangements, as well as various wheel motor arrangements, may be envisaged. It should be noted that the robotic cleaning device 10 may have any appropriate shape, such circular-shaped main body 11 as illustrated, or a triangular-shaped main body.

As an alternative to the above described propulsion system, a track propulsion system may be used or even a hovercraft propulsion system.

The propulsion system is further connected to two dead reckoning sensors 30, 30', one assigned to each driving wheel 12, 13, as illustrated in FIG. 1. The dead reckoning sensors 30, 30' are configured to independently measure distances travelled by the robotic cleaning device 10 by observing the movement and turns, respectively, of the driving wheels 12, 13, in order to help to position the robotic cleaning device 10, for example within a room.

The embodiment of the robotic cleaning device 10 as illustrated in FIG. 1 comprises two dead reckoning sensors 30, 30', it is however possible to envisage robotic cleaning devices comprising only one dead reckoning sensor 30, 30'.

A controller such as processing unit 16 controls the wheel motors 15a, 15b to rotate the driving wheels 12, 13 as required in view of information received from an obstacle detecting device (shown in FIG. 2) for detecting obstacles in the form of walls, floor lamps, table legs, around which the robotic cleaning device must navigate. The dead reckoning sensors 30, 30' are connected to the processing unit 16, for example via the electric wheel motors 15a, 15b, as illustrated in FIG. 1.

The obstacle detecting device may be embodied in the form of infrared (IR) sensors and/or sonar sensors, a microwave radar, a 3D sensor system registering its surroundings, implemented by means of e.g. a 3D camera, a camera in combination with lasers, a laser scanner, etc. for detecting obstacles and communicating information about any detected obstacle to the processing unit 16. The processing unit 16 communicates with the wheel motors 15a, 15b to control movement of the wheels 12, 13 in accordance with information provided by the obstacle detecting device.

In FIG. 1 the width W of the robotic cleaning device 10 is further illustrated. As the main body 11 has a round shape, the width W corresponds to a diameter of the main body. In general terms, the width W may be defined as the widest part or largest dimension of the robotic cleaning device 10 as measured in a forward direction M.

The main body 11 may optionally be provided with a cleaning member 17 for removing debris and dust from the surface to be cleaned in the form of a rotatable brush roll arranged in an opening 18 at the bottom of the robotic cleaner 10. Thus, the rotatable brush roll 17 is arranged along a horizontal axis in the opening 18 to enhance the dust and debris collecting properties of the cleaning device 10. In order to rotate the brush roll 17, a brush roll motor 19 is operatively coupled to the brush roll to control its rotation in line with instructions received from the processing unit 16. Optionally the robotic cleaning device 10 comprises a side brush (not shown) in order to optimize the cleaning. The side brush may be arranged at or close to a periphery of the opening 18 so that debris and dust is brushed into the brush roll 17 in front of the opening. In the examples illustrated in FIGS. 3a to 7, it may be assumed that a side brush (not shown) is arranged at the right periphery of the opening 18 of the robotic cleaning device 10 although the invention is not depending on this, which means the method according to the invention also works without a side brush.

Moreover, the main body 11 of the robotic cleaner 10 comprises a suction fan 20 creating an air flow for transporting debris to a dust bag or cyclone arrangement (not shown) housed in the main body via the opening 18 in the bottom side of the main body 11. The suction fan 20 is driven by a fan motor 21 connected to the processing unit 16 from which the fan motor 21 receives instructions for controlling the suction fan 20. It should be noted that a robotic cleaning device 10 having either one of the rotatable brush roll 17 and the suction fan 20 for transporting debris to the dust bag may be envisaged. A combination of the two will however enhance the debris-removing capabilities of the robotic cleaning device 10.

Alternatively, the robotic cleaning device 10 may comprise a mop (not shown) and/or a rotating floor brush (not shown).

With further reference to FIG. 1, the processing unit 16 may be embodied in the form of one or more microprocessors arranged to execute a computer program 25 downloaded to a suitable storage medium 26 associated with the microprocessor, such as a Random Access Memory (RAM), a Flash memory or a hard disk drive. The processing unit 16 is arranged to carry out a method according to embodiments of the present invention when the appropriate computer program 25 comprising computer-executable instructions is downloaded to the storage medium 26 and executed by the processing unit 16. The storage medium 26 may also be a computer program product comprising the computer program 25. Alternatively, the computer program 25 may be transferred to the storage medium 26 by means of a suitable computer program product, such as a digital versatile disc (DVD), compact disc (CD) or a memory stick. As a further alternative, the computer program 25 may be downloaded to the storage medium 26 over a network. The processing unit 16 may alternatively be embodied in the form of a digital signal processor (DSP), an application specific integrated circuit (ASIC), a field-programmable gate array (FPGA), a complex programmable logic device (CPLD), etc.

In FIG. 1 is further a contact detecting portion 32 illustrated. The contact detecting portion 32 is arranged at a front end of the robotic cleaning device 10 as seen in a direction of movement. The contact detecting portion 32 may extend over the whole front part of the robotic cleaning device 10, similar to a park distance sensor of a modern car. Alternatively, the contact detecting portion 32 may only extend over the front extremity of the robotic cleaning device 10, as illustrated in FIG. 1. The contact detecting portion 32 is arranged in order to detect whether or not the robotic cleaning device 10 is in contact with an object or landmark. This may be useful when a collision with obstacles has to be avoided.

Figure 2:
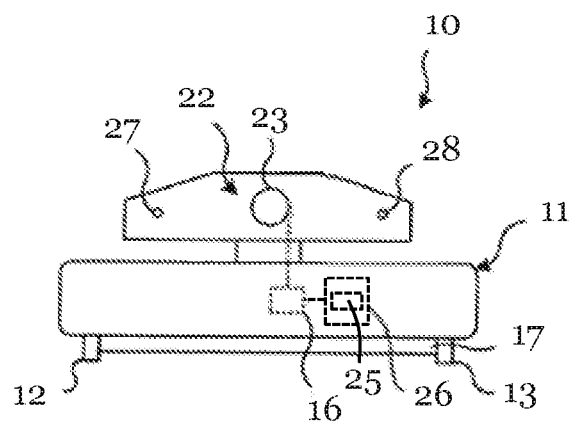
FIG. 2 schematically illustrates a front view onto a robotic cleaning device according to an embodiment of the invention.

FIG. 2 shows a front view of the robotic cleaning device 10 according to an embodiment illustrating the previously mentioned obstacle detecting device in the form of a 3D camera system 22 comprising at least a camera 23 and a first and a second structured light source 27, 28, which may be horizontally or vertically oriented line lasers. Further illustrated is the processing unit 16, the main body 11, the driving wheels 12, 13, and the rotatable brush roll 17 previously discussed with reference to FIG. 1. The processing unit 16 is operatively coupled to the camera 23 for recording images of a vicinity of the robotic cleaning device 10. The first and second structured light sources 27, 28 may preferably be vertical line lasers and are arranged lateral of the camera 23 configured to illuminate a height and a width that is greater than the height and width of the robotic cleaning device 10. The camera 23 is controlled by the processing unit 16 to capture and record a plurality of images per second. Data from the images is extracted by the processing unit 16 and the data is typically saved in the storage medium 26 along with the computer program 25.

The first and second structured light sources 27, 28 are configured to scan, preferably in a vertical orientation, the vicinity of the robotic cleaning device 10, normally in the direction of movement of the robotic cleaning device 10. The first and second structured light sources 27, 28 are configured to send out laser beams, which illuminate furniture, walls and other obstacles of a home or room. The camera 23 is controlled by the processing unit 16 to capture and record images from which the processing unit 16 creates a representation or layout of the surroundings that the robotic cleaning device 10 is operating in, by extracting features from the images and by measuring the distance covered by the robotic cleaning device 10, while the robotic cleaning device 10 is moving across the surface to be cleaned. Thus, the processing unit 16 may derive positional data of the robotic cleaning device 10 with respect to the surface to be cleaned from the recorded images, to generate a 3D representation of the surroundings in particular the obstacles.

The 3D representation generated from the images recorded by the 3D camera system 22 thus facilitates detection of obstacles in the form of walls, floor lamps, table legs, etc. around which the robotic cleaning device 10 must navigate as well as rugs, carpets, doorsteps, etc., that the robotic cleaning device 10 must traverse.

With respect to FIG. 2, for illustrational purposes, the 3D camera system 22 is separated from the main body 11 of the robotic cleaning device 10. However, in a practical implementation, the 3D camera system 22 is likely to be integrated with the main body 11 of the robotic cleaning device 10 to minimize the height of the robotic cleaning device 10, thereby allowing it to pass under obstacles, such as e.g. a sofa.

The robotic cleaning device 10 has now been described comprising an obstacle detecting device having a 3D camera 23 and first and second structured light sources 27, 28, as this provides for an efficient and rather quick navigation of the robotic cleaning device. However, in its simplest form the robotic cleaning device 10 may only comprise the contact detecting portion 32, since this contact detecting portion 32 enables the robotic cleaning device 10 to navigate around detected objects and obstacles. For the method as illustrated herein, it is sufficient that the robotic cleaning device 10 comprises the contact detecting portion 32, the obstacle detecting device is not essential to perform the method described herein.

In the following FIGS. 3a to 7, the robotic cleaning device 10 is illustrated in the figures by a solid line showing its current position, while earlier positions 11 of the robotic cleaning device 10 are illustrated in a dashed line. Additionally, the arrows A in the FIGS. 3a to 7 illustrate the direction of movement of the robotic cleaning device 10, thus how the robotic cleaning device 10 has been driving in the different illustrated map graphs or cleaning patterns outlined by path markers 36.

Although it is illustrated in FIGS. 3a to 7 that the path markers 36 are registered centrally in relation to the robotic cleaning device 10, the path markers may be registered at a left or right periphery of the robotic cleaning device 10 or the cleaning opening 18 of the robotic cleaning device 10, as seen in a direction of movement of the robotic cleaning device 10.

Figure 3A:
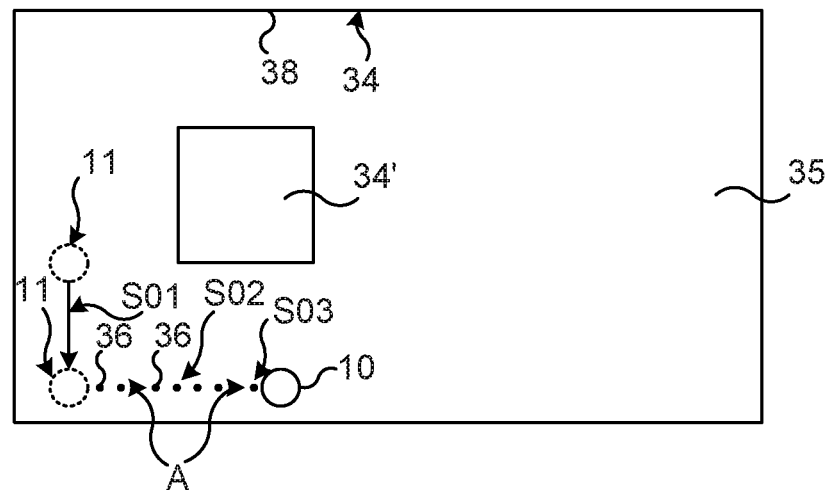
FIG. 3a schematically illustrates the registering of path markers when starting inward cleaning according to a method of the invention.
Figure 3B:
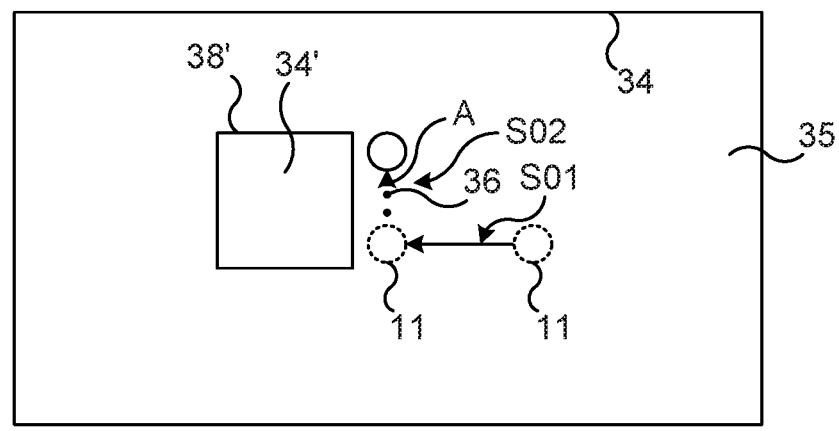
FIG. 3b schematically illustrates the registering of path markers when starting outward cleaning according to a method of the invention.

Referring now to FIGS. 3a and 3b which illustrate how the robotic cleaning device 10 is detecting S01 a first object 34, 34' either being part of a surface 35 to be cleaned or surrounding the surface 35. The first object may be in the form of a wall 34 of a room or furniture 34' arranged on the surface 35. The first object may for example also be a chimney, an elevator shaft, stairs, a carpet etc. The robotic cleaning device 10 detects S01 the first object 34, 34' and moves S01 towards it. As soon as the first object 34, 34' is reached, the robotic cleaning device 10 starts with following S02 a boundary or edge of the first object 34, 34' while registering S03 path markers 36 at intervals on the surface 35.

FIG. 3a illustrates how the robotic cleaning device 10 detects S01 the first object 34, which is embodied as a wall of a room. The robotic cleaning device 10 moves towards the first object 34 until a boundary 38, in the illustrated case the wall, is reached. When the robotic cleaning device 10 observes that the boundary 38 is reached, for example via detection by the obstacle detecting device or the contact detecting portion 32, the processing unit 16 starts to register S03 the path markers 36 at intervals and stores them for example on the storage medium 26, while following S02 the boundary 38 using the contact detecting portion 32 or the obstacle detecting device. FIG. 3a illustrates how the robotic cleaning device 10 starts with an outer boundary 38 by inward cleaning, which will be described later on referring to FIGS. 4 to 5c and 7. The boundary 38 in FIG. 3a is represented the wall and may thus be considered as an outer boundary 38.

FIG. 3b on the other hand illustrates how the robotic cleaning device 10 detects and moves S01 to the first object 34' arranged within the surface 35. As previously described, the robotic cleaning device 10 is detecting and moving S01 towards the first object 34' arranged within the surface 35, for example represented by a table or a cabinet. As soon as the first object 34' is reached, the robotic cleaning device 10 starts to follow S02 the edge 38' while the processing unit 16 continuously registers S03 path markers 36 at intervals. The robotic cleaning device 10 thus performs an outward cleaning in FIG. 3b. This will be further explained when referring to FIGS. 6a and 6b.

It is preferred that the robotic cleaning device 10 only starts registering S03 path markers when the robotic cleaning device 10 has started to follow the edge 38' or boundary 38, as illustrated in FIGS. 3a and 3b.

Figure 5A:
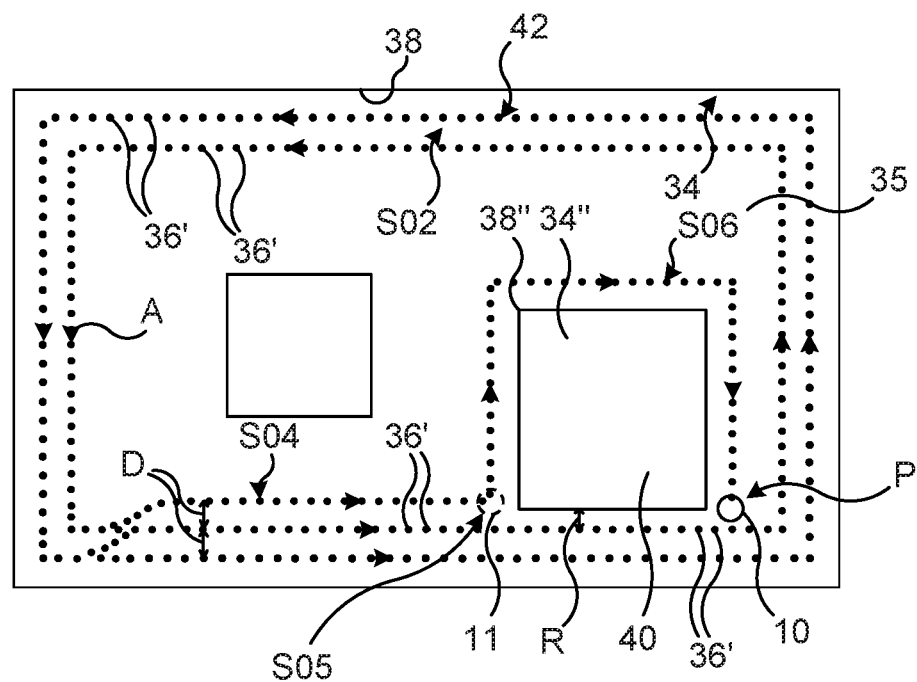
FIG. 5a schematically illustrates the switching from tracing path markers to following an edge of an object upon encountering of an object.
Figure 5B:
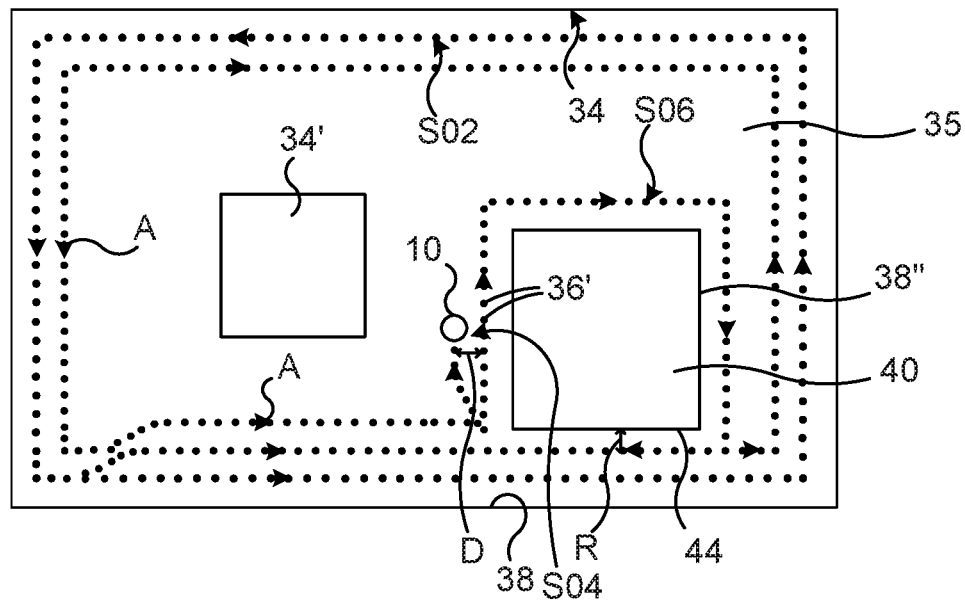
FIG. 5b schematically illustrates a similar view as FIG. 5a; in this case the object is entirely encircled prior to switching back to path markers tracing.
Figure 5C:
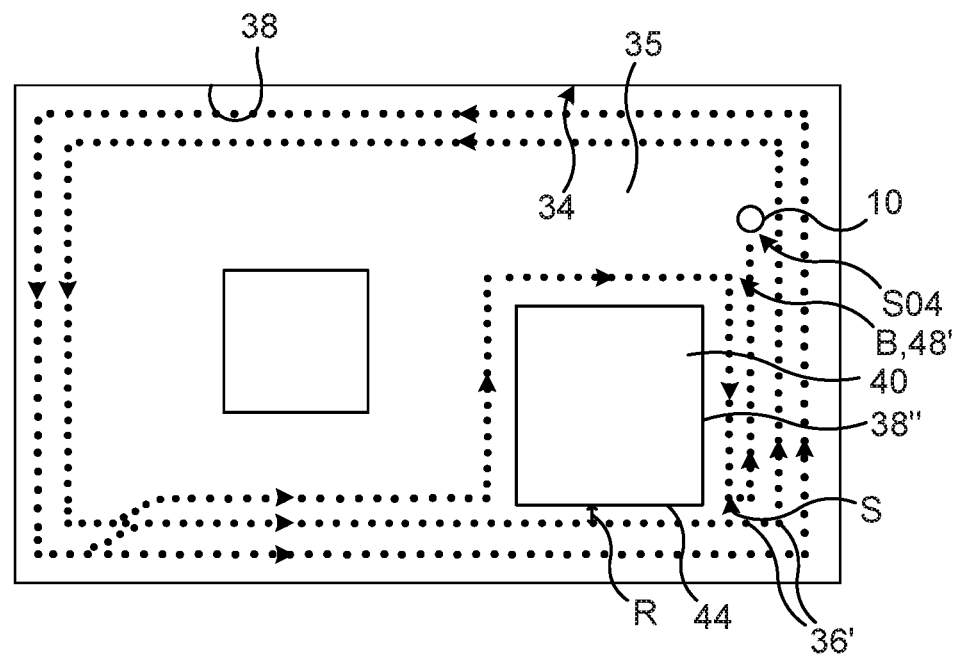
FIG. 5c schematically illustrates a similar view as FIGS. 5a and 5b; in this case the object is not entirely encircled prior to switching back to path markers tracing.
Figure 6A:
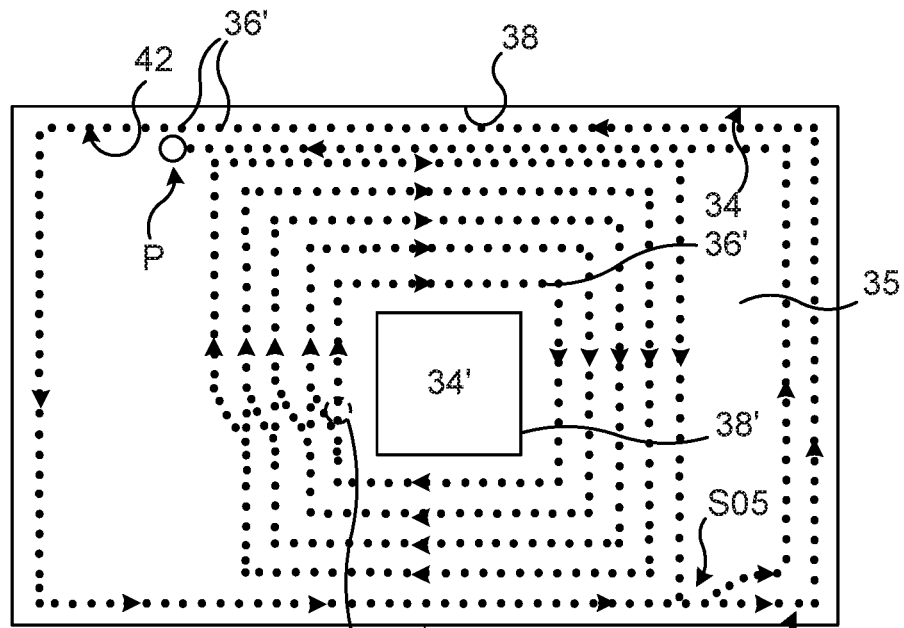
FIG. 6a schematically illustrates outward cleaning.
Figure 6B:
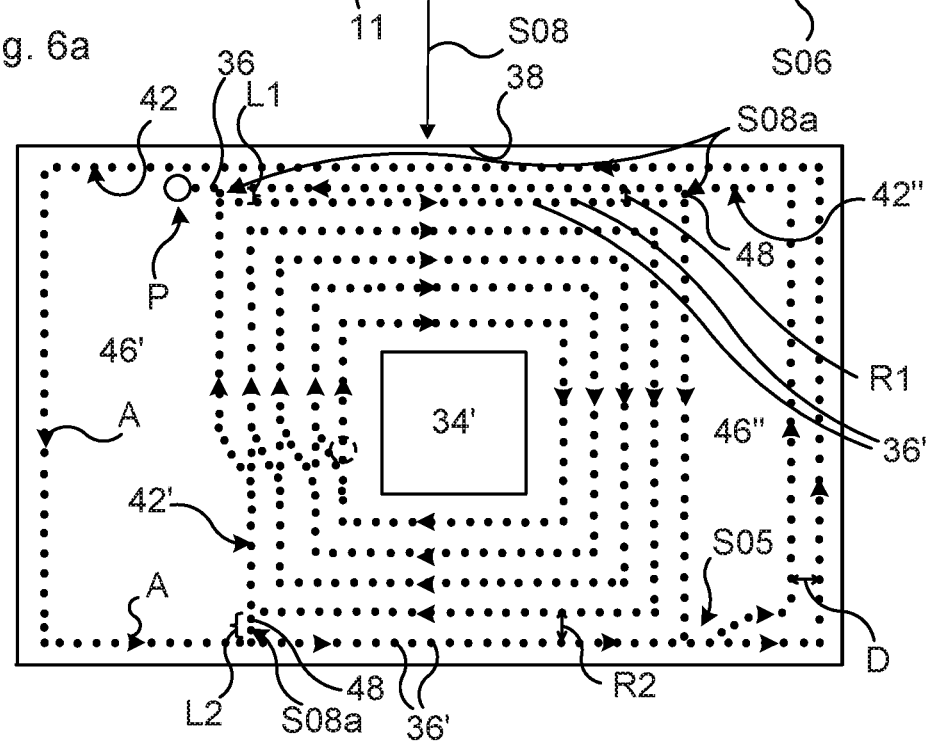

The method described herein thus works for inward cleaning as illustrated in FIGS. 3a and 4 to 7 and for outward cleaning as illustrated in FIGS. 3b, 6a and 6b.

The intervals between the registered S03 path markers 36 may be time intervals or distance intervals. Thus the path markers 36 may be dropped or registered S03 at time intervals of for example 1 to 30 seconds, preferably 3 to 20 seconds and more preferably from 5 to 15 seconds or at distance intervals of for example 1 to 20 cm, preferably 5 to 15 cm and more preferably in the range of 7 to 13 cm.

Alternatively the distance intervals may be in the range of 1% to 100% of the largest dimension of the robotic cleaning device 10, more preferably 20% to 50% of the largest dimension of the robotic cleaning device 10, which is in the illustrated case the diameter or width W but may in other cases be a length or width of the robotic cleaning device 10.

In FIGS. 3a and 3b the path markers 36 are illustrated with a rather big distance in between, this is mainly for illustrative purposes. In FIGS. 4 to 7, the path markers 36 are illustrated as doted lines, in which every dot represents a path marker 36. The size relation between the robotic cleaning device 10 and the intervals/distance between path markers 36 is only to be understood illustrative and not absolute.

Figure 4:
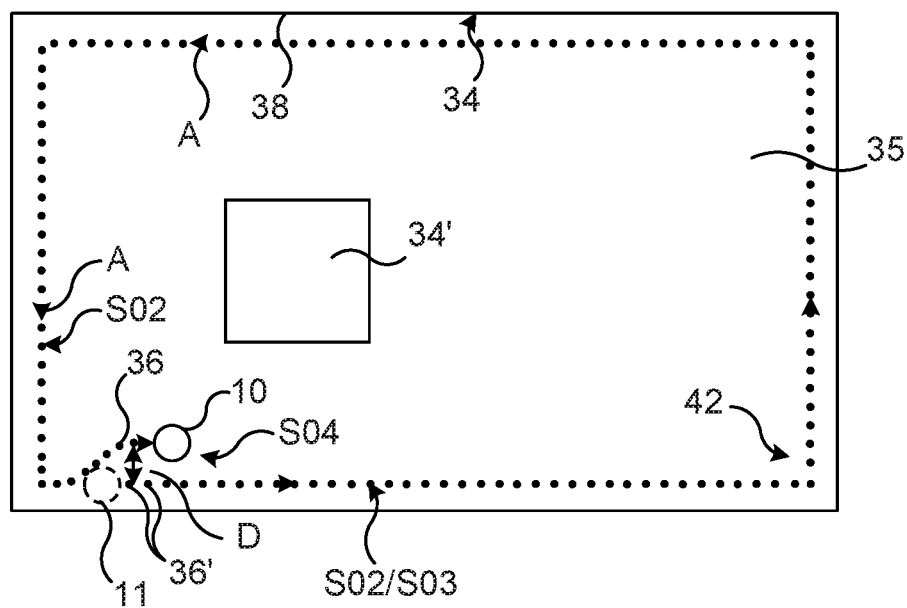
FIG. 4 schematically illustrates how a loop is recognized and potentially closed.

FIG. 4 illustrates how the robotic cleaning device 10 is following S02 the boundary 38 until previously registered S03 path markers 36' are encountered. When the robotic cleaning device 10 encounters previously registered path markers 36' it starts tracing S04 the previously registered path markers 36' while continuing to register S03 path markers 36 at intervals, at an offset D. In the illustrated case in FIG. 4, the robotic cleaning device 10 performs a full loop 42 along the boundary 38 of the object 34 until it encounters previously registered path markers 36'.

Again, as previously mentioned the robotic cleaning device may trace S04 the previously registered path markers 36' with a right or left periphery of the robotic cleaning device or the cleaning opening 18 of the robotic cleaning device 10, as seen in a direction of movement of the robotic cleaning device 10. The previously registered path markers 36' may have been registered themselves at a left or right periphery of the robotic cleaning device or the cleaning opening 18.

Additionally, in case the path markers 36, 36' are registered at a left or right periphery of the cleaning opening 18 or the robotic cleaning device 10, the robotic cleaning device 10 may follow the boundary 38, 38' of the first object 34, 34' or the edge 38" of the first and second object 40 so that the path markers 36 are registered on the periphery of the robotic cleaning device 10 or the cleaning opening 18 of the robotic cleaning device 10 that is located away from the boundary 38, 38'.

In case a side brush (not shown) is installed on the robotic cleaning device 10 for example on the right side of the cleaning opening 18, as seen in a moving direction of the robotic cleaning device 10, the robotic cleaning device 10 may be configured to always follow S02 the boundary 38, 38' or edge 40 of the first object 34, 34' or the second object 40 so that the side brush is following the boundary 38, 38' or edge 40 while registering S03 path markers 36 on the left side of the cleaning opening 18 as seen in the direction of movement of the robotic cleaning device.

The offset D is preferably less than the width of the opening 18 (c.f. FIG. 1) of the robotic cleaning device 10. This may ensure a proper cleaning. In some cases the offset D may be larger, for example in case a side brush or two side brushes are used. The offset D may then be less than a sphere of action of the cleaning opening 18 and the side brush. Although in the figures the distance towards the boundary 38, 38' is illustrated as being similar to the offset D, it is clear that in practice this distance corresponds at least approximately to half of the offset D, as the robotic cleaning device 10 is following the boundary 38, 38'.

Optionally the processing unit 16 may be configured to recognize S07 and close the loop 42 of FIG. 4, as there will normally be a small gap where no path markers 36 are registered when the robotic cleaning device switches from the following S02 and registering S03 to tracing S04 previously registered path markers 36'. The processing unit 16 may thus close this small gap and represent the loop 42 as a closed loop in a map graph stored on the storage medium 26.

FIG. 5a illustrates how the robotic cleaning device 10 may encounter a second object 40 while tracing S04 of previously deposited path markers 36'. As illustrated in FIG. 5a, the robotic cleaning device 10 encountered the second object 40 at the previous position 11. As soon as the robotic cleaning device 10 detects and identifies the second object 40, it switches S05 to following S06/following mode and follows S06 the second object 40 along the edge 38".

The robotic cleaning device 10 may only switch S05 to boundary 38, 38' or edge 38" following S06 when it cannot pass the second object 40 thus when it would need to change direction for navigating around the second object. In other words it may only switch S05 when it drives directly towards and thus basically into the second object 40.

FIG. 5a further illustrates a distance R as measured perpendicular to a sequence of previously registered path markers 36' being arranged closest to an edge part 44 of the second obstacle 40 and the edge part 44. The distance R may determine future decisions of the robotic cleaning device 10, as described referring to FIGS. 5b and 5c.

When the robotic cleaning device 10 reaches the current position P, as shown in FIG. 5a, it will again encounter previously registered path markers 36' and has then two possibilities to proceed. The two possibilities are illustrated in FIGS. 5b and 5c, respectively.

FIG. 5b illustrates how the robotic cleaning device 10 will continue to follow S06 the edge 38" of the second object 40 upon encountering previously registered path markers 36' until the processing unit 16 detects that the second object 40 has been fully encircled. When the processing unit 16 detects that the second object was fully encircled, the robotic cleaning device 10 is switching back to tracing S04 of previously registered path markers 36' at the offset D. As can be seen in FIG. 5b such a full circle around the second object may lead to double cleaning of a specific region, in the illustrated case a region close to the lower edge part 44 of the second object 40. A full encircling of the second object 40 may provide information to the robotic cleaning device 10 regarding the exact shape and position/extension of the second object 40.

Still referring to FIG. 5b, the robotic cleaning device 10 may decide to fully encircle the second object 40 if it is detected that the distance R is larger than half of the offset D. This may for example be detected by the processing unit 16 by continuously analyzing the map graph. When the distance R is larger than half of the offset D a region close to the lower edge part 44 is not entirely clean and thus the robotic cleaning device 10 may decide to fully encircle the second object 44 to clean this region.

On the other hand if the processing unit 16 detects that the distance R is smaller or approximately the same as half of the offset D, the robotic cleaning device 10 may switch back to tracing S04 previously deposited path markers 36' as soon as previously deposited path markers 36' are encountered when following the edge 38" of the second obstacle 44, as illustrated in FIG. 5c. In FIG. 5c previously registered path markers 36' are encountered when the robotic cleaning device 10 reaches position S. Thus at position S, the robotic cleaning device 10 may switch back from following S06 to tracing S04 previously registered path markers.

Referring now to FIGS. 6a and 6b, which illustrates the step of simplifying S08 a loop 42 by closing and splitting the loop 42 to form two loops 42', 42", the loop 42 will only be closed and split S08a if certain conditions apply, which will be explained below. The simplifying S08 of loops 42 is illustrated by an outward cleaning example, as previously described. The arrow between FIGS. 6a and 6b illustrates schematically the simplification S08 step.

FIG. 6a illustrates how the robotic cleaning device 10 cleans the surface 35 by starting following S02 the boundary 38' of the second object 34' being arranged within the surface 35 to be cleaned and performing outward cleaning by tracing S04 previously registered path markers 36'. The dashed position 11 again illustrates a previous position 11 of the robotic cleaning device 10 which was in the illustrated case the starting point of the cleaning. From following S02 the second object 34' the robotic cleaning device 10 has moved outwards until it encountered the outer, first object 34 in the form of the boundary 38 where it switched S05 to wall following S06 the boundary 38 of the outer, first object 34.

FIG. 6a thus illustrates that the robotic cleaning device 10 can start with an object 34', 40 being arranged within the surface 35 to be cleaned. Thus the method works fine when the robotic cleaning device 10 for example starts the cleaning at the second object 34', 40, as illustrated in FIGS. 5a to 5c.

FIG. 6b illustrates how the loop 42 may be closed and split S08a into a plurality of loops 42', 42", which define a plurality of areas 46', 46". In order to simplify S08 the cleaning the processing unit 16 closes and splits S08a the current closed loop 42 into a first and a second loop 42', 42". This may for example be done when the robotic cleaning device 10 reached its current position P. The simplification comprises adding bridge sequences 48 at the positions indicated in FIG. 6b. These bridge sequences 48 may comprise virtually added path markers 36 which may be traced S04 by the robotic cleaning device 10 when the latter is cleaning the first area 46' and the second area 46" to be cleaned, respectively.

The bridge sequences 48 may have length L1, L2 that is smaller than the offset D, as otherwise the bridge sequences 48 will be based on the assumption that there are no objects 34, 34', 40 or obstacles where the bridge sequences are added. Thus there is no assumption made. The bridge sequences 48 are based on the knowledge that there are no objects or obstacles where theses bridge sequences 48 are added.

The distances R1, R2, illustrated in FIG. 6b are measured in a direction perpendicular to a moving direction A of the robotic cleaning device 10 in between two neighbouring sequence sections, each sequence section comprising a plurality of registered path markers 36, 36'. The distances R1, R2 must be smaller than the offset D, otherwise the processing unit 16 will not add the bridge sequences 48, as described above.

The described closing and splitting S08a of loops may be applied in many situations such as for example also in the map graph illustrated in FIG. 5c. A bridge sequence 48' may for example be added at position B in FIG. 5c, in case the determined distance R, R1, R2 between the current sequence sections and neighbouring sequence section is smaller than the offset D, for simplifying the current loop 42.

When the robotic cleaning device 10 is done with the first area 46' the second area 46" will be cleaned by tracing S04 the previously registered path markers 36' of the second loop 42".

Figure 7:
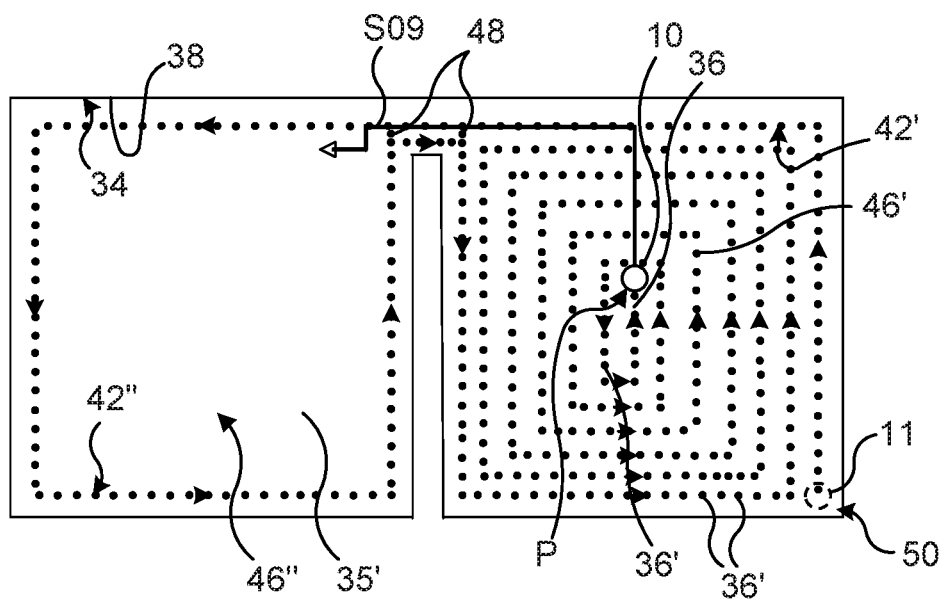
FIG. 7 schematically illustrates how the robotic cleaning device is moving from a first area to a second area after the first area is clean.

FIG. 7 illustrates another surface 35' to be cleaned consisting of two rooms interconnected by a door opening, for example. In FIG. 7, the robotic cleaning device 10 has already cleaned the first area 46' to be cleaned and the loop 42 has ben simplified by adding two bridge sequences 48 so that the loop 42 is simplified into two loops 42', 42". The starting position 11 illustrates where the robotic cleaning device 10 started its cleaning by following S02 the boundary 38 of the object 34 while registering S03 path markers 36 at regular intervals. When the robotic cleaning device 10 reaches its current position P, it will detect that it cannot trace S04 any previously registered path markers 36' any longer with establishing an offset D to anyone of the previously registered path markers 36' and will therefore register that the first area 46' has been entirely cleaned.

The robotic cleaning device 10 will then move S09 to the second area 46" to be cleaned and finish this second area 46" by tracing S04 previously registered path markers 36' of the second loop 42".

As schematically illustrated in FIG. 7, it may be beneficial to start the cleaning in a corner 50 of the first object 34, 34' as this simplifies the map graph and thus the shape of the loops 42', 42".

Figure 8:
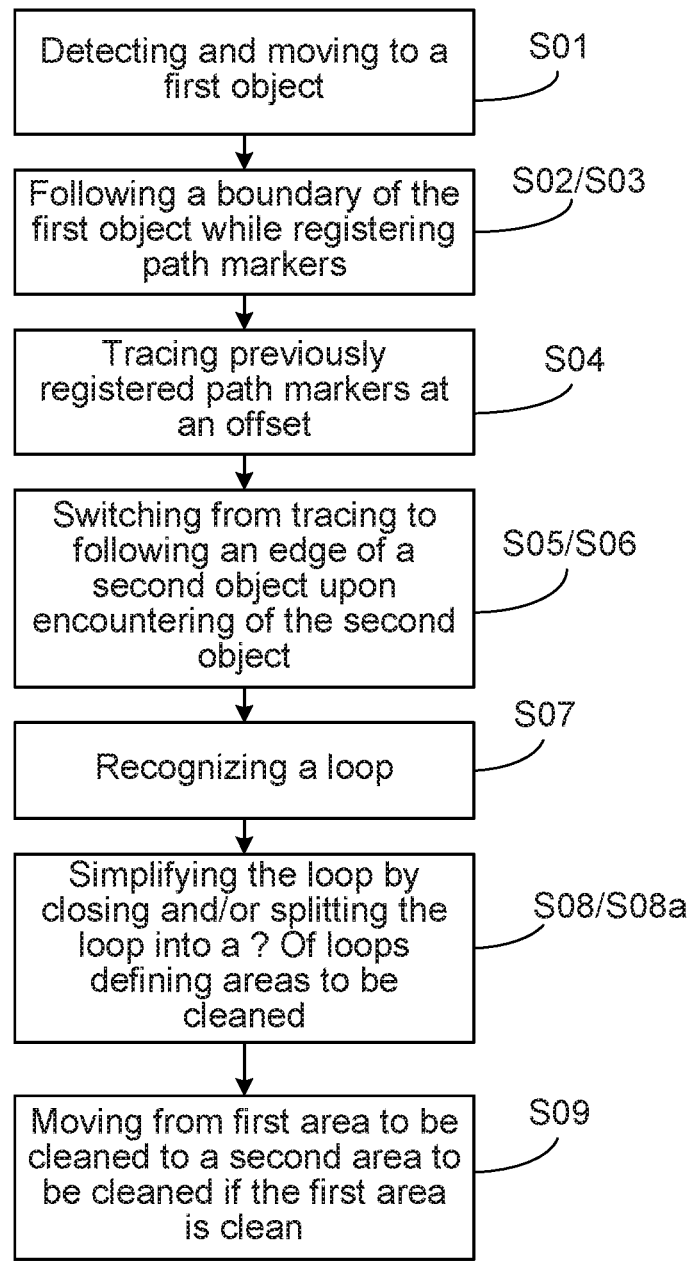
FIG. 8 illustrates the method steps of the present invention.

FIG. 8 illustrates the method steps according to the present invention in a flow diagram. Steps S02 to S08 may be repeated whenever previously registered path markers 36' or a second, third, fourth, etc. object 40 is encountered or if loops 42 need to be simplified.

Although the invention has now been described by various examples, the invention is not limited to those specific examples. The method according to the invention is versatile and universal and may be applied to many potential surfaces to be cleaned having simple or very complicated layouts.

Further in the above described path markers 36, 36' are continuously registered S03 from the beginning of following S02 a boundary 38, 38' until the cleaning is done.

Additionally although not illustrated in the figures, the robotic cleaning device 10 and the processing unit 16, respectively, may decide if a surface 35 to be cleaned is too big by splitting that surface 35 into two or more surfaces. In such a case the robotic cleaning device 10 may be configured to follow a borderline or border bridge sequence in between the two surfaces in order to close the loop of the big surface and in order to ensure that there is no obstacle along that border bridge sequence. A border bridge sequence may even be longer than the offset D and thus it needs to be verified if the assumption that no object is arranged along the border bridge sequence can be made. This splitting of a big surface may thus also be part of the simplification step.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of operating a robotic cleaning device over a surface to be cleaned, the method being performed by the robotic cleaning device, the method comprising:

following a boundary of a first object while registering path markers at intervals on the surface, the registered path markers are virtual markers stored in a memory device of the robotic cleaning device, the virtual markers including positional data indicating respective positions of the robotic cleaning device detected by a sensor;

tracing the registered path markers at an offset upon encountering one or more of the registered path markers; and switching from tracing the registered path markers to following an edge of a second object upon detection of the second object.

2. The method according to claim 1, further comprising following the edge of the second object until the registered path markers are again encountered.

3. The method according to claim 1, further comprising following the edge of the second object until the second object is encircled.

4. The method according to claim 1, further comprising recognizing a loop defining an area to be cleaned upon encountering one or more of the registered path markers, wherein the loop comprises a plurality of the registered path markers.

5. The method according claim 4, comprising simplifying the loop for generating an efficient cleaning pattern.

6. The method according to claim 5, wherein the simplifying comprises splitting the loop into a plurality of loops defining a plurality of areas to be cleaned, so that the robotic cleaning device can clean the areas one after the other.

7. The method according to claim 6, further comprising designating a first area of the plurality of areas as being clean when the robotic cleaning device encounters previously registered path markers when moving in any direction without being able to establish the offset to any of the registered path markers.

8. The method according to claim 7, further comprising moving from the first area to a second area to be cleaned of the plurality of areas and tracing the registered path markers of a loop defining the second area to be cleaned.

9. The method according to claim 1, wherein the path markers are registered at a side periphery of the robotic cleaning device or a cleaning opening of the robotic cleaning device, as seen in a direction of movement of the robotic cleaning device.

10. The method according to claim 9, wherein tracing the registered path markers comprises tracing the registered path markers with a side periphery of the robotic cleaning device or the cleaning opening of the robotic cleaning device, as seen in a direction of movement of the robotic cleaning device.

11. The method according to claim 9, wherein the robotic cleaning follows the boundary of the first object or the edge of the second object so that the path markers are registered on the side periphery of the robotic cleaning device or the cleaning opening of the robotic cleaning device that is located away from the boundary or the edge.

12. The method according to claim 1, wherein the registering of path markers is started when a corner of the first object is detected.

13. A robotic cleaning device comprising:
a main body;
a propulsion system arranged to move the robotic cleaning device;
a contact detecting portion connected to the main body and arranged to detect if the robotic cleaning device is in contact with an object;

a dead reckoning sensor operatively connected to the propulsion system; and a processing unit arranged to control the propulsion system;

wherein the processing unit is connected to the dead reckoning sensor and configured to:

follow a boundary of a first object while registering path markers at intervals on the surface, the registered path markers are virtual markers stored in a memory device of the robotic cleaning device, the virtual markers including positional data indicating respective positions of the robotic cleaning device detected by the dead reckoning sensor;

trace the registered path markers at an offset upon encountering one or more of the registered path markers; and switch from tracing the registered path markers to following an edge of a second object upon detection of the second object.

14. A computer program comprising computer-executable instructions stored in a non-transitory medium for causing a robotic cleaning device to:

follow a boundary of a first object while registering path markers at intervals on the surface, the registered path markers are virtual markers stored in a memory device of the robotic cleaning device, the virtual markers including positional data indicating respective positions of the robotic cleaning device detected by a sensor;

trace the registered path markers at an offset upon encountering one or more of the registered path markers; and switch from tracing the registered path markers to following an edge of a second object upon detection of the second object.

15. The computer program of claim 14, wherein the computer-executable functions are executed on a processing unit in the robotic cleaning device.

* * * * *